United States Patent
Németh et al.

(10) Patent No.: US 8,010,536 B2
(45) Date of Patent: *Aug. 30, 2011

(54) COMBINATION OF COLLABORATIVE FILTERING AND CLIPRANK FOR PERSONALIZED MEDIA CONTENT RECOMMENDATION

(75) Inventors: Bottyán Németh, Budapest (HU); Simon J. Gibbs, San Jose, CA (US); Mithun Sheshagiri, Mountain View, CA (US); Priyang Rathod, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 540 days.

This patent is subject to a terminal disclaimer.

(21) Appl. No.: 12/120,211

(22) Filed: May 13, 2008

(65) Prior Publication Data

US 2009/0132520 A1 May 21, 2009

Related U.S. Application Data

(60) Provisional application No. 60/989,413, filed on Nov. 20, 2007.

(51) Int. Cl.
*G06F 7/00* (2006.01)
*G06F 17/30* (2006.01)

(52) U.S. Cl. ............... 707/748; 707/752; 707/754

(58) Field of Classification Search .......... None
See application file for complete search history.

(56) References Cited

U.S. PATENT DOCUMENTS

| | | | | |
|---|---|---|---|---|
| 2006/0173974 | A1* | 8/2006 | Tang | 709/217 |
| 2008/0126303 | A1* | 5/2008 | Park et al. | 707/3 |
| 2008/0147649 | A1* | 6/2008 | Kim et al. | 707/5 |
| 2008/0243812 | A1* | 10/2008 | Chien et al. | 707/5 |

OTHER PUBLICATIONS

U.S. Appl. No. 12/120,209, filed May 13, 2008.
U.S. Appl. No. 60/242,139, filed on Oct. 23, 2000.
Bharat et al. "Hilltop: A Search Engine based on Expert Documents." 1998.
Brin et al. "The Anatomy of a Large-Scale Hypertextual Web Search Engine." In Ashman and Thislewaite, pp. 107-117. Brisbane, Australia. http://citeseer.ist.psu.edu/brin98anatomy.html.
Office Action dated Sep. 17, 2010 from U.S. Appl. No. 12/120,209.
Office Action dated Feb. 18, 2011 from U.S. Appl. No. 12/120,209.

\* cited by examiner

*Primary Examiner* — Uyen T. Le
(74) *Attorney, Agent, or Firm* — Beyer Law Group LLP

(57) ABSTRACT

Various methods for combining ClipRank and Collaborative Filtering are provided. According to one embodiment, the ClipRank weights associated with pieces of media content are calculated based on the relationships among the pieces of media content and various users. Those pieces having ClipRank weights greater than or equal to a predefined weight threshold are selected from the pieces of media content to obtain selected pieces of media content. Collaborative Filtering is then performed on the selected pieces of media content and the users.

42 Claims, 11 Drawing Sheets

COMBINATION OF COLLABORATIVE FILTERING AND CLIPRANK FOR PERSONALIZED MEDIA CONTENT RECOMMENDATION

CROSS REFERENCE TO RELATED APPLICATION

This patent application takes priority under 35 U.S.C. 119 (e) to U.S. Provisional Patent Application No. 60/989,413, filed on Nov. 20, 2007, entitled "A PERSONALIZED VIDEO RECOMMENDER SYSTEM" by Gibbs et al., which is hereby incorporated by reference in its entirety and for all intents and purposes.

FIELD OF THE INVENTION

The present invention generally relates to systems and methods for ranking media content, especially video content. More specifically, the present invention relates to systems and methods for ranking media content using their relationships with end users and/or with each other and in combination with Collaborative Filtering.

BACKGROUND OF THE INVENTION

Presently, there is a vast amount of media content, such as audios, videos, or graphics, available from a variety of sources. From digital graphics and music to films or movies to broadcast television programs to cable or satellite television programs to home movies or user-created video clips, there are many repositories and databases from which people may choose and obtain media content in various formats, and the amount of media content available continues to grow at a very high rate. Broadcast, cable, or satellite companies often provide hundreds of different channels for viewers to choose from. Movie rental companies such as Netflix and Blockbuster have tens, even hundreds, of thousands of titles on DVDs (digital video disc) or video cassettes. More recently, the Internet has also lent its unique capability and become a great repository and distribution channel for video media world-wide. Online stores such as Amazon.com have a great number of CDs, DVDs, and downloadable media files for sale. Websites such as YouTube and AOL Video have immense audio and video collections, often millions of audio/video clips, contributed by users from all over the world.

With such a great amount of available media content, often there is the need to rank a selected set of media content. For example, suppose a person is looking for video clips relating to the subject matter of figure skating at YouTube's website. The person searches for the video clips using the keywords "figure skating," and may currently be presented with nearly sixty thousand choices. Obviously, it is impractical and nearly impossible to present all sixty thousand video clips to the person simultaneously. Instead, the video clips are presented in a sequential order, perhaps a few at a time. YouTube may choose to display twenty video clips on each web page and enable the person to examine and/or view as many video clips as he or she chooses by going through multiple web pages. In this case, the nearly sixty thousand video clips need to be ranked first so that they may be presented to the person in sequence. For example, YouTube may rank the video clips according to their relevance to the subject matter of figure skating, e.g. more relevant video clips ranked higher, or according to their posting dates, e.g., newer video clips ranked higher. Other ranking methods include ranking according to popularity, by alphabetical order, etc.

In another similar example, suppose a person wishes to purchase romantic music in MP3 format from Amazon. The person searches for the downloadable music files using the keywords "romance" at Amazon's website, and may currently be presented with nearly nine thousand songs. Again, the nearly nine thousand songs need to be ranked before being presented to the person in a sequential order, and the ranking may be performed according to relevance, best selling, price, average customer review, release date, etc.

In the above examples, although the rankings are performed for specific persons, i.e., the person searching for the video clips or the music files, the method or criteria used to rank the search results often do not take into consideration the person's own preferences or tastes. In other words, the ranking is not personally tailored for the individual users or customers. Consequently, the resulting orders may not be best suitable for the specific individuals for whom the rankings are performed.

SUMMARY OF THE INVENTION

Broadly speaking, the present invention generally relates to ranking media content using their relationships with end users and/or with each other and in combination with Collaborative Filtering. Various systems and methods for combining and/or blending ClipRank and Collaborative Filtering are provided.

According to one embodiment, the ClipRank weights associated with a plurality of pieces of media content are calculated based on the relationships among the plurality of pieces of media content and a plurality of users. Those pieces having ClipRank weights greater than or equal to a predefined weight threshold are selected from the plurality of pieces of media content to obtain a plurality of selected pieces of media content. Collaborative Filtering is then performed on the plurality of selected pieces of media content and the plurality of users.

According to another embodiment, Collaborative Filtering on a plurality of pieces of media content and a plurality of users is performed for one of the plurality of users. Personalized ClipRank weights associated with the plurality of pieces of media content is calculated for the user based on Collaborative Filtering ratings obtained for the plurality of pieces of media content for the user.

According to another embodiment, ClipRank and Collaborative Filtering results are blended in various ways. First, general and/or personalized ClipRank weights associated with a plurality of pieces of media content based on relationships among the plurality of pieces of media content and a plurality of users. Collaborative Filtering ratings associated with the plurality of pieces of media content in connection with the plurality of users are determined. Next, the general ClipRank weights, the personalized ClipRank weights and the Collaborative Filtering ratings associated with the plurality of pieces of media content are blended in various ways. Selected pieces of media content are ranked based on the blended results of their generalized and/or personalized ClipRank weights and Collaborative Filtering ratings.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
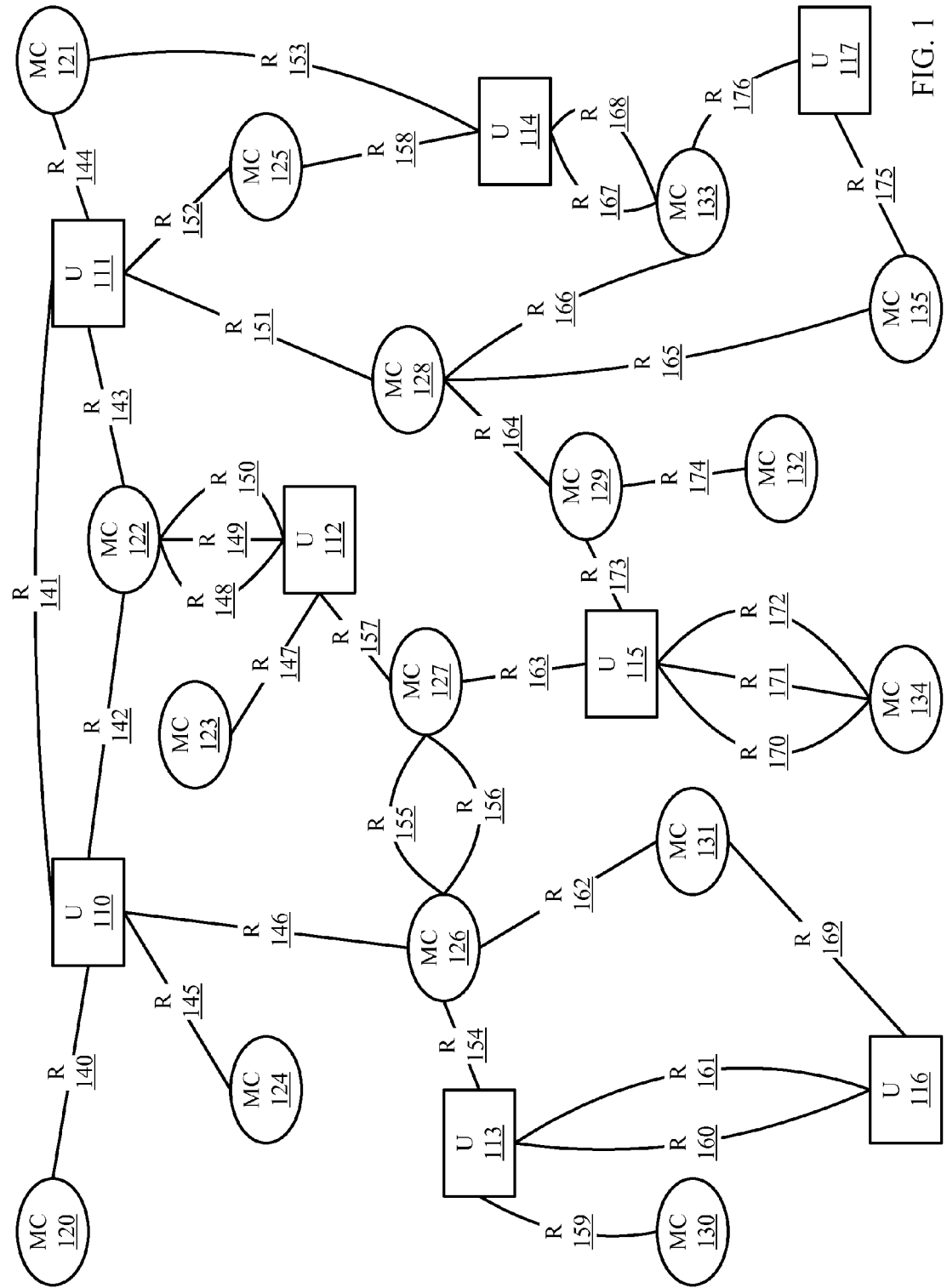
FIG. 1 illustrates a relationship graph between a set of users and a set of media content according to one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

According to various embodiments, systems and methods for ranking a set of media content using their relationships with end users and optionally, in combination with Collaborative Filtering are provided. Ranking a set of media content using their relationships with end users is sometimes referred to herein as "ClipRank." The types of media content include, but are not limited to, audio content, video content, and/or graphics content. A relationship may exist between a user and a piece of media content, two users, or two pieces of media content. A piece of media content may be, for example, an audio, a video, or an image. There is no limit on the number of specific relationships a user may have with a piece of media content or another user, and similarly, there is no limit on the number of specific relationships a piece of media content may have with a user or another piece of media content.

The types of relationships may vary greatly, and their definitions depend entirely on the requirements of the specific implementations of the system and the method. For example, between a user and a piece of media content, the types of relationships may include, but not limited to, the user has created the piece of media content, the user has viewed the piece of media content, the user has recorded the piece of media content, the user has downloaded the piece of media content, the user has uploaded the piece of media content, the user has purchased the piece of media content, the user has rented the piece of media content, the user has commented on the piece of media content, the user has manually rated the piece of media content, the user has tagged the piece of media content, the user has recommended the piece of media content to at least one other user, the user has marked the piece of media content as his or her favorite, and the user is the owner of the piece of media content. Between two users, the types of relationships may include, but are not limited to: (a) the first user and the second user both belong to the same social group, (b) the first user has marked the second user as a friend, and (c) the first user has subscribed to the second user. Between two pieces of media content, the types of relationships may include, but are not limited to: (d) the first piece of media content and the second piece of media content are related, and (e) the first piece of media content and the second piece of media content both belong to the same program series.

Each relationship between a user and a piece of media content, between two users, and between two pieces of media content is assigned a weight. Usually, although not necessarily, relationships of the same type are assigned the same weight and the weight for each type of relationships is predefined. Furthermore, relatively more important types of relationships are assigned higher weights than relatively less important types of relationships. Again, what is considered a more or less type of relationships depends entirely on the requirements of the specific implementations of the system and the method. In addition, the users and the pieces of media content each has an initial weight.

The weights of the relationships between the users and/or the pieces of media content are used to calculate the final weights for the users and the pieces of media content, and the final weights are used to rank the users and/or the pieces of media content. Thus, the weights of the users and the pieces of media content may be referred to as "ClipRank values." By using the weights of the relationships between the users and/or the pieces of media content to calculate the final weights for the users and the pieces of media content, which are then used to rank the users and/or the pieces of media content, the ranking results of the users and/or the pieces of media content reflect the social relationships among the users and the pieces of media content.

The relationships between the users and the pieces of media content may be represented using a relationship graph. FIG. 1 illustrates a relationship graph between a set of users and a set of media content according to one embodiment. For easy visual distinction, in FIG. 1, each user, denoted by "U", is represented by a rectangular node and each piece of media content, denoted by "MC", is represented by an oval node. However, when calculating their respective weights, the users and the pieces of media content are treated exactly the same, and no distinction is made between a user and a piece of media content for the weight calculation purpose. Each relationship, denoted by "R", between a user, i.e., a rectangular node, and a piece of media content, i.e., an oval node, or between two users or between two pieces of media content is represented by a line, i.e., an edge, connecting the two appropriate nodes. Sometimes, the same user and piece of media content or the same two users or the same two pieces of media content may have multiple relationships of the same or different types. In this case, each specific relationship is represented by a separate line connecting the same two appropriate nodes.

Using the relationship graph shown in FIG. 1 as an example, there are three lines, R 148, R 149, and R 150, connecting the node U 112 and the node MC 122, suggesting that there are three separate relationships between user 112 and media content 122, e.g., a video file. The three relationships, R 148, R 149, and R 150, may be of the same type or may be of different types. For example, R 148 may represent a relationship where user 112 has viewed media content 122; R 149 may represent a relationship where user 112 has commented on media content 122; and R 150 may represent a relationship where user 122 has recommended media content 122 to another user.

There are two lines, R 167 and R 168, connecting the node U 114 and the node MC 133, e.g., an audio file. Again, these two lines may represent two relationships of the same type or of different types. For example, if user 114 has listened to media content 133 twice, R167 and R168 may each represents the relationship where user 114 has listened to media content 133 once.

There are two lines, R 160 and R 161, connecting the node U 113 and the node U 116. R 160 may represent a relationship where user 113 considers user 116 as a friend. R 161 may represent a relationship where user 116 has subscribed to user 113.

There is one line, R 162, connecting the node MC 126 and the node MC 131, which may represent a relationship where media content 126 and media content 131 both belong to the same program series.

Thus, in the relationship graph, every user and every piece of media content is represented by a node, and every relationship between a user and a piece of media content or between two users or between two pieces of media content is represented by an edge connecting the two appropriate nodes. If multiple relationships exist between a user and a piece of media content or between two users or between two pieces of media content, then multiple edges connect the two appropriate nodes, with each edge representing a specific relationship. There is no limit on the number of relationships, i.e., the number of edges, a user or a piece of media content may have, and there is no limit on the number of types of relationships that may exist between a user and a piece of media content or between two users or between two pieces of media content.

As indicated above, each user and each piece of media content may be associated with a weight, denoted by "W(mc_u)", and each relationship between a user and a piece of media content or between two users or between two pieces of media content may be associated with a weight, denoted by "W(r)". The weights associated with the relationships may be used to calculate the weights of the users and the pieces of media content. The weights of the users and/or the pieces of media content may be used to rank the users and/or the pieces of media content.

General ClipRank

According to one embodiment, the weights associated with the relationships connected to a particular media content or user are used to calculate the final weights associated with that media content or user.

Figure 2:
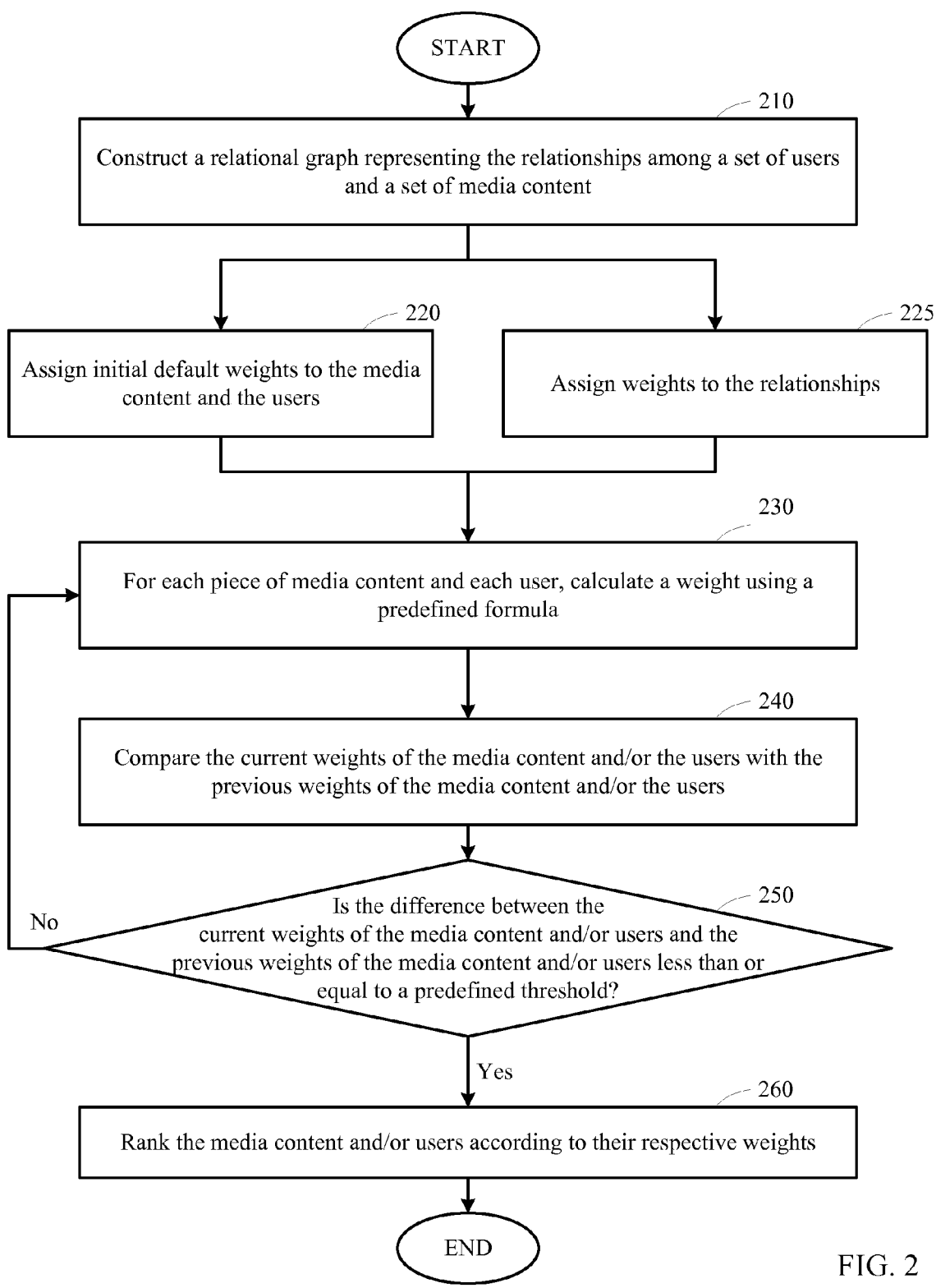
FIG. 2 shows a method of ranking the media content using their relationships with the users according to one embodiment of the invention.

FIG. 2 shows a method of ranking the media content using their relationships with the users according to one embodiment. A relationship graph, such as the one shown in FIG. 1, is constructed for a set of users and a set of media content (step 210). The relationship graph includes the relationships among the users and/or the media content. The information or data used to contract such a relationship graph may be obtained from various sources. For example, websites often monitor and record user actions performed at their sites. The recorded user actions may be stored in database(s) for future analysis. Thus, the stored data may be parsed to determine specific relationships among individual users and pieces of media content. More specifically, suppose a user views a video clip at a website, and the application server hosting the website monitors the viewing action from the user and records the related information in a database. Subsequently, the recorded data may be parsed to determine the identities of the user and the video clip, and the action the user has performed, i.e., viewing, with respect to the video clip. This information may then be incorporated into the relationship graph to establish a viewing relationship between the user and the video clip. Similarly, suppose a first user subscribes to a second user, e.g., the first user subscribing to the media content posted by the second user, at a website, and the subscription is recorded by the application server hosting the website. Subsequently, the recorded data may be parsed to determine the identities of the two users, and that one user has subscribed to another user. This information may then be incorporated into the relationship graph to establish a subscription relationship between the two users.

Once a relationship graph has been constructed, a default initial weight is assigned to each user and each piece of media content (step 220), and a pre-defined weight is assigned to each relationship among the users and the pieces of media content (step 225). Different systems may be used to represent the weight values associated with the users, the media content, and the relationships. According to some embodiments, a numerical system with a specific range is used. Any numerical system and any range may be selected. For example, the weight values may be integers between 1 to 5, 1 to 10, 1 to 100, etc.

Sometimes, certain relationships are considered more important than others. What relationship(s) is/are considered more or less important depends entirely on the specific requirements of a particular implementation of the system and method. Relationships that are considered important to one implementation may or may not be considered important to another implementation. Usually, although not necessarily, a relatively more important relationship is associated with a higher weight value than a relatively less important relationship. In addition, usually, although not necessarily, relationships of the same type are assigned the same weight value. The following Table 1 shows one example of the weight values associated with some relationships. The weight values are integers range from 1 to 5, and the importance of the relationships is determined based on one particular implementation.

TABLE 1

Sample Weights Associated with Relationships

| Relationship | Weight Value |
| --- | --- |
| Relationships between a user (denoted by "U") and a piece of media content (denoted by "MC") | |
| U created MC | 2 |
| U viewed MC | 3 |
| U recorded MC | 4 |
| U downloaded MC | 3 |
| U uploaded MC | 4 |
| U purchased MC | 5 |
| U rented MC | 3 |
| U commented on MC | 1 |
| U manually rated MC | 1 |
| U tagged MC | 1 |
| U recommended MC | 2 |
| U marked MC as favorite | 3 |
| U owned MC | 5 |

TABLE 1-continued

Sample Weights Associated with Relationships

| Relationship | Weight Value |
| --- | --- |
| Relationships between two users (denoted by "U1" and "U2") | |
| U1 and U2 belong to same group | 1 |
| U1 subscribed to U2 | 3 |
| U1 marked U2 as friend | 2 |
| Relationships between two pieces of media content (denoted by "MC1" and "MC2") | |
| MC1 related to MC2 | 2 |
| MC1 and MC2 belong to same series | 1 |

Using the sample weights shown in Table 1, for example, each relationship in FIG. 1 would be assigned a weight value between 1 and 5. In addition, each user and each piece of media content in FIG. 1 is assigned an initial default weight value. For example, the initial default weight value for the user and media content may be 1.

The weights associated with the relationships are used to calculate the final weights associated with the users and pieces of media content. For each piece of media content and each user, calculate a new weight value using a predefined formula that incorporates the weights associated with the relationships connected with that piece of media content or user (step 230). The formula may be chosen based on the requirements of the specific implementations of the system and method. According to one embodiment, the weight associated with a piece of media content or a user may be calculated using the following equation:

$$W(\text{mc\_u}) = \sum_{i=1}^{i=n} (W_i(r) * W_i(\text{mc\_u})); \quad (1)$$

where W(mc_u) denotes the weight associated with the piece of media content or the user for which the weight is calculated, n denotes the total number of relationships the piece of media content or the user has with other pieces of media content or other users, $W_i(r)$ denotes the weight associated with a relationship, relationship i, the piece of media content or the user has with another piece of media content or another user, and $W_i(\text{mc\_u})$ denotes the weight associated with the corresponding other piece of media content, media content i, or the corresponding other user, user i, having the relationship, relationship i, with the piece of media content or the user.

Applying the above equation (1) to some of the nodes shown in FIG. 1 to further illustrates its usage, for example, the node representing media content 131, MC 131, has two relationships, R 162 and R 169. R 162 is connected to the node representing media content 126, MC 126; and R 169 is connected to the node representing user 116, U 116. Thus, applying equation (1) to calculate the weight value for MC 131, $$W(MC\ 131)=W(R\ 162)*W(MC\ 126)+W(R\ 169)*W(U\ 116).$$

The node representing user 115, U 115, has five relationships, R 163, R 170, R 171, R 172, and R 173. R 163 is connected to the node representing media content 127, MC 127; R 170, R 171, and R 172 are all connected to the node representing media content 134, MC 134; and R 173 is connected to the node representing media content 129, MC 129. Applying equation (1) to calculate the weight value for U 115, $$W(U\ 115)=W(R\ 163)*W(MC\ 127)+W(R\ 170)*W(MC\ 134)+W(R\ 171)*W(MC\ 134)+W(R\ 172)*W(MC\ 134)+W(R\ 173)*W(MC\ 129).$$

The node representing media content 120, MC 120, only has one relationship, R 140, which is connected to the node representing user 110, U 110. Applying equation (1) to calculate the weight value of MC 120, $$W(MC\ 120)=W(R\ 140)*W(U\ 110).$$

Thus, by repeatedly applying the above equation (1) for each user and each piece of media content in the relationship graph, the weight values associated with each user and each piece of media content may be calculated. Note that by incorporating the weights associated with the relationships connected with a particular user or piece of media content, the weight value calculated for that user or piece of media content using equation (1) takes into consideration the social relationships among the users and pieces of media content.

Once the values of all the weights associated with the users and the pieces of media content have been calculated, the weight values of the users and the pieces of media content calculated during the current iteration, i.e., the current weight values, are compared with the weight values of the users and the pieces of media content calculated during the previous iteration, i.e., the previous weight values (step 240). If the difference between the current weight values and the previous weight values is less than or equal to a predefined threshold (step 250), then the weight calculation stops, and the current weight values are the final weight values for the users and the pieces of media content. Otherwise, a new iteration is repeated, such as a new set of weight values for the users and the pieces of media content are calculated (step 230).

There are a variety of different ways to determine the difference between the weight values calculated during the current iteration and the weight values calculated during the previous iteration. According to one embodiment, the two sums of all the weight values calculated during the two consecutive iterations may be compared. In other words, the difference between the sum of all the weight values calculated during the current iteration and the sum of all the weight values calculated during the previous iteration is compared against a predefined threshold to determine whether the weight calculation process should stop. The difference between the two sums may be calculated using the following equation:

$$\text{difference} = \sum_{i=1}^{i=n} W_{i,j}(\text{mc\_u}) - \sum_{i=1}^{i=n} W_{i,(j-1)}(\text{mc\_u}), \quad (2)$$

where n denotes the total number of the pieces of media content and the users, $W_{i,j}(\text{mc\_u})$ denotes the weight associated a piece of media content, media content i, or a user, user i, calculated during the current iteration, iteration j, and $W_{i,(j-1)}(\text{mc\_u})$ denotes the weight associated a piece of media content, media content i, or a user, user i, calculated during the previous iteration, iteration j−1. Similarly, the difference between the average of all the weight values calculated during the current iteration and the average of all the weight values calculated during the previous iteration may be compared against a predefined threshold to determine whether the weight calculation process should stop. The difference between the two averages may be calculated using the following equation:

$$\text{difference} = \frac{\sum_{i=1}^{i=n} W_{i,j}(mc\_u)}{n} - \frac{\sum_{i=1}^{i=n} W_{i,(j-1)}(mc\_u)}{n}, \quad (3)$$

where, again, n denotes the total number of the pieces of media content and the users, $W_{i,j}(mc\_u)$ denotes the weight associated a piece of media content, media content i, or a user, user i, calculated during the current iteration, iteration j, and $W_{i,(j-1)}(mc\_u)$ denotes the weight associated a piece of media content, media content i, or a user, user i, calculated during the previous iteration, iteration j−1. The predefined threshold value may vary depending on the actual equation used.

According to another embodiment, instead of considering all the weights together, the difference between the weights calculated for each individual user and each individual piece of media content during the current and previous iteration may be compared separately, and the calculation process stops when each individual difference is less than or equal to a predefine threshold. For example, the threshold value may be defined as 0.1, 0.5, etc. The difference of a weight associated with a particular user or piece of media content calculated during the current iteration and the previous iteration may be calculated using the following equation:

$$\text{difference} = W_{i,j}(mc\_u) - W_{i,(j-1)}(mc\_u), \quad (4)$$

where $W_{i,j}(mc\_u)$ denotes the weight associated a piece of media content, media content i, or a user, user i, calculated during the current iteration, iteration j, and $W_{i,(j-1)}(mc\_u)$ denotes the weight associated the same piece of media content, media content i, or the same user, user i, calculated during the previous iteration, iteration j−1.

According to another embodiment, instead of considering all the weights associated with both the users and the media content, only the difference between the weights calculated for the media content or the users calculated during the current and previous iteration is compared against a predefined threshold. For example, the difference between the two sums of the weights associated only with the media content may be calculated using the following equation:

$$\text{difference} = \sum_{i=1}^{i=n} W_{i,j}(mc) - \sum_{i=1}^{i=n} W_{i,(j-1)}(mc), \quad (5)$$

where n denotes the total number of the pieces of media content, $W_{i,j}(mc)$ denotes the weight associated a piece of media content, media content i, calculated during the current iteration, iteration j, and $W_{i,(j-1)}(mc)$ denotes the weight associated a piece of media content, media content i, calculated during the previous iteration, iteration j−1. The difference between the two sums of the weights associated only with the users may be calculated using the following equation:

$$\text{difference} = \sum_{i=1}^{i=n} W_{i,j}(u) - \sum_{i=1}^{i=n} W_{i,(j-1)}(u), \quad (6)$$

where n denotes the total number of the users, $W_{i,j}(u)$ denotes the weight associated a user, user i, calculated during the current iteration, iteration j, and $W_{i,(j-1)}(u)$ denotes the weight associated a user, user i, calculated during the previous iteration, iteration j−1.

Other embodiments may use alternative methods or formulas to determine the difference between the weight values calculated during the two consecutive, i.e., the current and the previous, iterations. Note that between one iteration and another iteration, only the weights associated with the users and the media content change, while the weights associated with the relationships remain the same. The weights calculated for the users and the media content during the previous iteration are used to calculate the weights for the users and the media content during the current iteration. Steps 230, 240, and 250 may be repeated as many times as necessary, until the difference between the weight values calculated during the current iteration and the weight values calculated during the previous iteration is less than or equal to the predefined threshold. The weights calculated during the final iteration are the final weights associated with the users and the media content.

The final weights are then used to rank the media content and/or the users (step 260). For example, a piece of media content with a relatively higher weight value is ranked before a piece of media content with a relatively weight value. If two pieces of media content or two users happen to have the same weight value, then a choice needs to be made as to which piece of media content or user is ranked before the other piece of media content or user. The choice may be arbitrary, or may take into consideration of some additional factors, such as the respective dates, lengths, number of relationships, etc. of the two pieces of media content.

The media content may be ranked separately among themselves, and the users may be ranked separately among themselves. Of course, it is also possible to rank both the media content and the users together.

The ranking result obtained using the method shown in FIG. 2 is not biased toward any individual user. That is, the same ranking order would result regardless of for whom the ranking is performed. Thus, this ranking result is referred to as "general ClipRank."

Personalized ClipRank

Alternatively, the method shown in FIG. 2 may be modified slightly to obtain ranking biased toward a specific user. According to some embodiment, in step 220, instead of assigning a default value as the initial weights for the media content and the users, the initial weights assigned to the media content are determined based on data obtained from the specific user for whom the ranking is performed. The initial weights assigned to the users may still be a default value or may also be determined based on data obtained from the specific user. By doing so, the final ranking result is biased toward that user, which is referred to as "personalized ClipRank." The other steps remain unchanged.

There are a variety of ways to determine initial weight values for the media content using data obtained from a specific user. For example, the user may manually specify an initial weight value for some, or possibly even all, of the pieces of media content in a relationship graph.

Alternatively, the initial weight values for the media content may be automatically determined based on past actions taken by the specific user in connection with the media content. According to one embodiment, the pieces of media content that have been operated on a multi-media device may be automatically rated based the actions taken by a user of the device in connection with the multi-media content. Suppose the user of the multi-media device is the specific user for whom personalized ClipRank is to be performed, then the ratings obtained for the media content from the user's multi-media device may be used to determine the initial weight values associated with the media content. There may be a direct correlation between the rating of a piece of media content and the initial weight value assigned to the piece of media content, e.g., relatively higher rating corresponding to relatively higher weight and vice versa. Automatically rating media content based on device usage information is described in more detail in co-pending U.S. patent application Ser. No.12/120,217, filed on May 13, 2008 (concurrently herewith on the same day as the present application), entitled "SYSTEM AND METHOD FOR AUTOMATICALLY RATING VIDEO CONTENT" by Gibbs et al., which is hereby incorporated by reference in its entirety and for all intents and purposes.

Optionally, the initial weights assigned to the users may also be determined based on data obtained from or associated with the specific user with respect to the other users, if such data exists. For example, the specific user may manually specify and assign an initial weight value to each user. Alternatively, users that have relationships with the specific user may be assigned a higher weight than users that do not have any relationship with the specific user. If no data exists to provide initial weights for the users with respect to the specific user, the default weight value may be assigned to all the users.

If the initial weights assigned to the pieces of media content and optionally the users in the relationship graph are determined based on data associated with or obtained from a specific user, then the final ranking result is biased toward that user and personalized for that user.

Updating ClipRank Result

To rank a specific set of media content or a specific set of users using the method shown in FIG. 2, a relationship graph between the media content and the users, such as the one shown in FIG. 1, needs to be constructed. Thereafter, the set of media content or the set of users included in the relationship graph may be ranked based on their final weights. However, new media content and/or new users continuously become available. Thus, the relationship graph needs to be updated from time to time to include new pieces of media content and/or new users. Consequently, new weights need to be calculated and new rankings need to be conducted based on the updated relationship graph.

According to one embodiment, each time the relationship graph is updated, weights for all the users and media content, both old and new, are recalculated using the method shown in FIG. 2. However, this may be time-consuming, especially if the relationship graph includes a very large number of media content and users and relationships. Although the relationship graph shown in FIG. 1 only includes a few dozen nodes and edges representing the users and the media content and their relationships, in practice, a relationship graph often includes hundreds, thousands, hundreds of thousands of users, media content, and relationships. Thus, recalculating the weights for all the users and media content often may not be very efficient, especially if only a few new pieces of media content and users and their relationships are added to the relationship graph.

According to another embodiment, each time the relationship graph is updated, only the weights for the new users and media content are calculated. FIG. 3A-3D illustrate the steps of calculating the weights associated with the new users and media content without having to re-calculate the weights associated with the existing users and media content, which have been calculated previously.

Figure 3A:
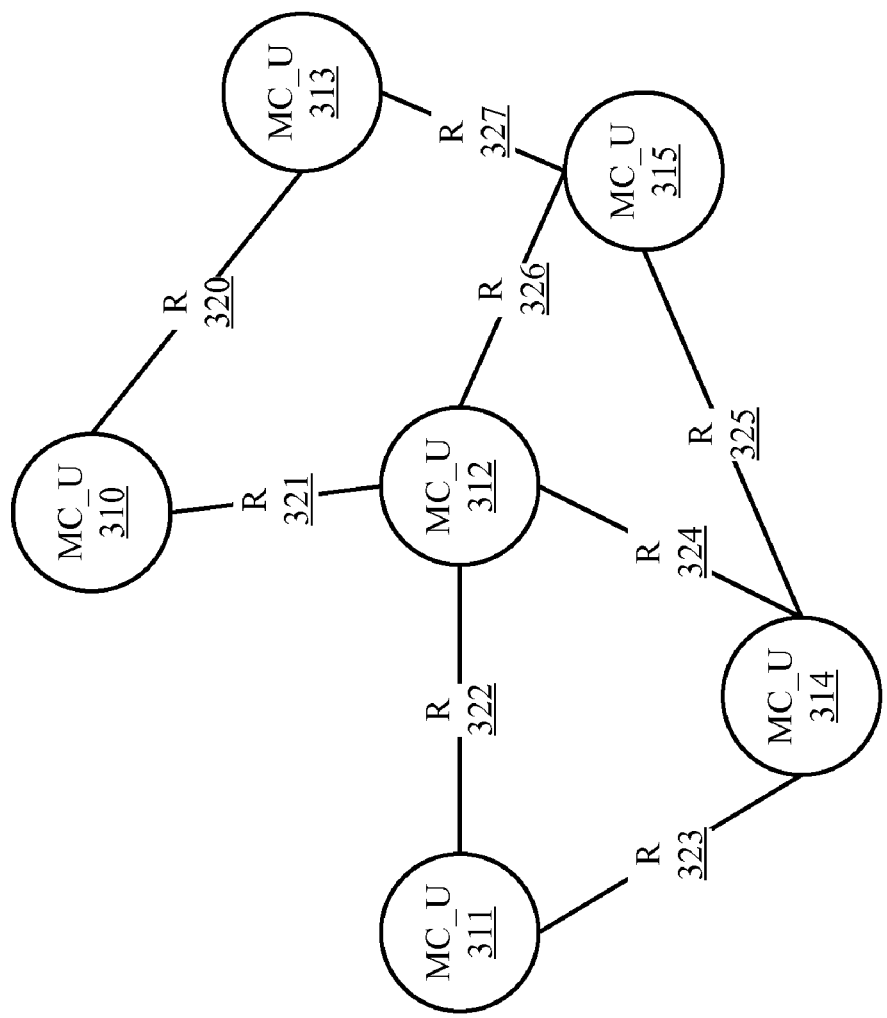
FIG. 3A-3D illustrate the steps of calculating the weights associated with new users and media content added to an existing relationship graph without recalculating the weights associated with users and media content already existed in the relationship graph according to one embodiment of the invention.

FIG. 3A illustrates a sample relationship graph, which includes six nodes, MC_U 310, MC_U 311, MC_U 312, MC_U 313, MC_U 314, and MC_U 315, and eight edges, R 320, R 321, R 322, R 323, R 324, R 325, R 326, and R 327 connecting the various nodes. Each node represents a user or a piece of media content, and each edge represents a relationship between a user and a piece of media content or between two users or between two pieces of media content represented by the corresponding two nodes. To simplify the discussion, FIG. 3A only includes a small number of users, media content, and relationships, but in practice, such a relationship graph often includes a much greater number of users, media content, and relationships.

Figure 3B:
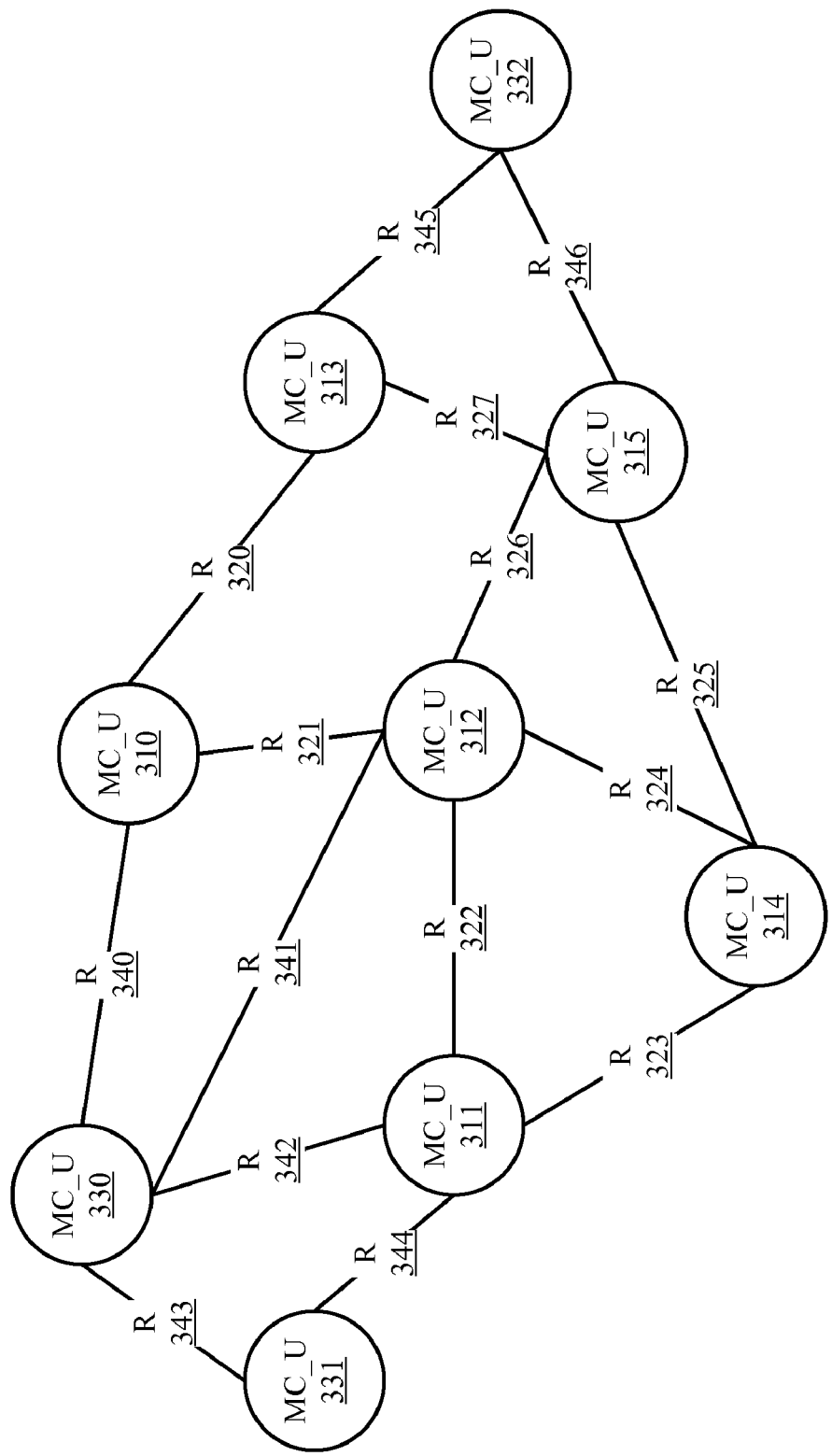

Suppose the weights of the nodes in FIG. 3A have been calculated using the method shown in FIG. 2. Subsequently, new users, media content, and/or relationships become available and need to be added to the relationship graph. In FIG. 3B, three new nodes, MC_U 330, MC_U 331, and MC_U 332 are added to the relationship graph shown in FIG. 3A, each node representing a user or a piece of media content. These new nodes have relationships, represented by the edges, either with some of the existing nodes or among themselves. For example, node MC_U 332 has two relationships, R 345 and R 346, with nodes MC_U 313 and MC_U 315 respectively, both being nodes already existed in the previous version of the relationship graph shown in FIG. 3A. Node MC_U 331 has two relationships, R 343 and R 344. Edge R 343 is connected with node MC_U 330, which is a new node added to the current version of the relationship graph, and edge R 344 is connected to node MC_U 311, which is a node already existed in the previous version of the relationship graph. Node MC_U 330 has four relationships, each represented by an edge. Edges R 340, R 341, and R 342 are connected with nodes MC_U 310, MC_U 312, and MC_U 311 respectively, all of which being nodes already existed in the previous version of the relationship graph. Edge R 343 is connected with node MC_U 331, which is a new node added to the current version of the relationship graph.

Figure 3C:
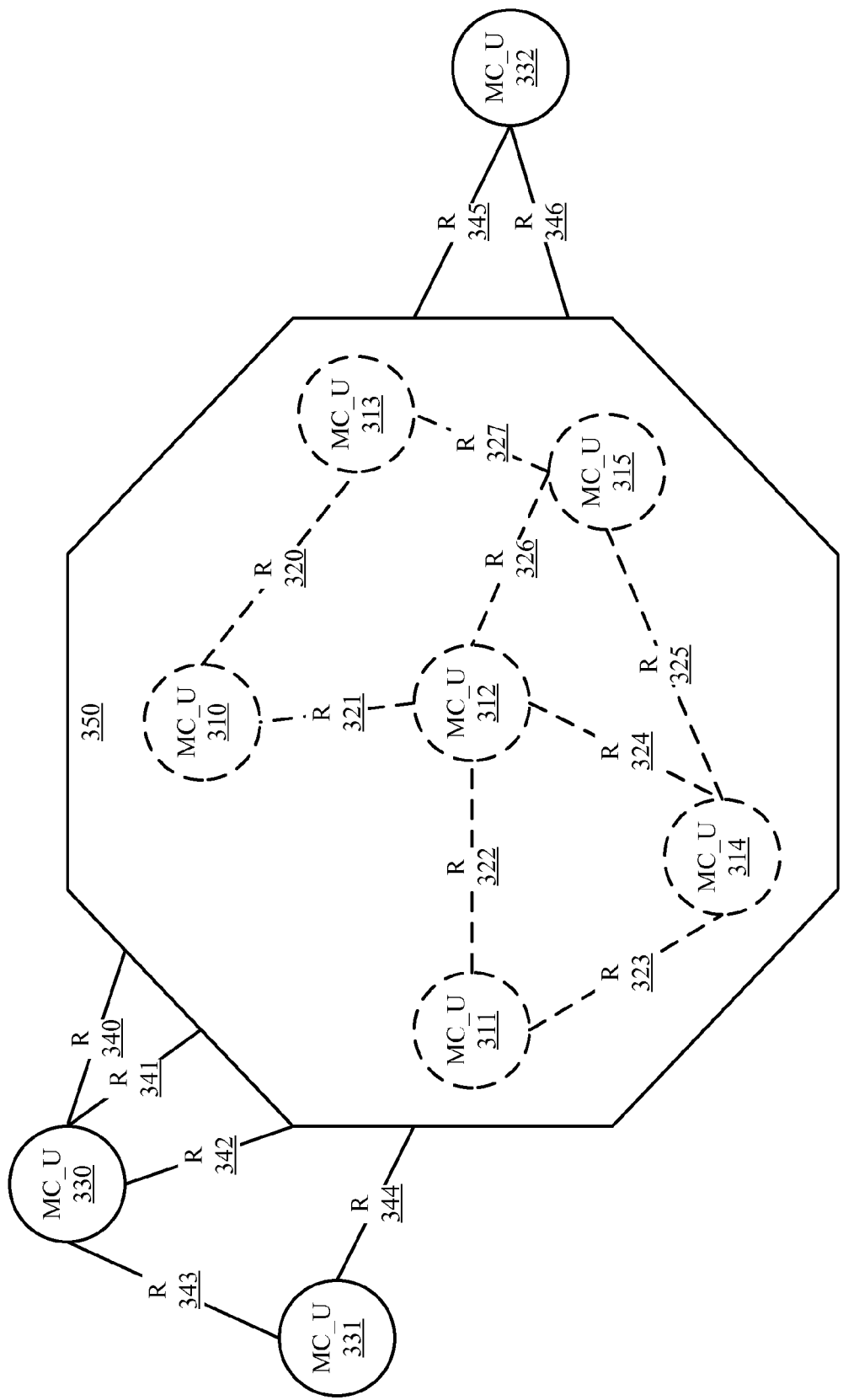

To calculate the weights associated the new nodes MC_U 330, MC_U 331, and MC_U 332 without recalculating the weights associated with the existing nodes whose weights have already been calculated, the older part of the relationship graph may be combined and collapsed into a single node. FIG. 3C illustrates collapsing the nodes and edges from the previous version of the relationship graph shown in FIG. 3A into a single combined node 350. Combined node 350 encompasses nodes MC_U 310, MC_U 311, MC_U 312, MC_U 313, MC_U 314, and MC_U 315, and edges R 320, R 321, R 322, R 323, R 324, R 325, R 326, and R 327. The weight of combined node 350 may be the average weights of the nodes included therein. In the example shown in FIG. 3C, the weight of combined node 350 equals $$(W(MC\_U\ 310)+W(MC\_U\ 311)+W(MCU\ 312)+W(MCU\ 313)+W(MC\_U\ 314)+W(MC\_U\ 315))/6.$$

In addition, if any of the new nodes, e.g., MC_U 330, MC_U 331, or MC_U 332, have any relationships with any of the existing nodes included in combined node 350, then the relationships are now connected with combined node 350. Thus, edges R 340, R 341, R 342, R 344, R 345, and R 346 are now connected with combined node 350.

Figure 3D:
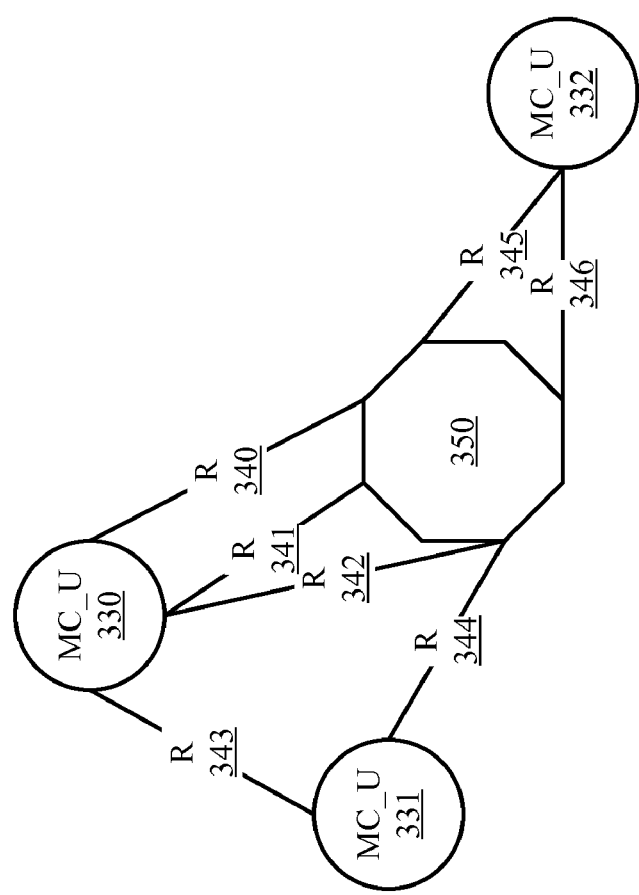

Hereafter, the weights of the new nodes MC_U 330, MC_U 331, and MC_U 332 may be calculated using the method shown in FIG. 2, with combined node 350 behaving like a single node. FIG. 3D shows the relationship graph that may be used to calculate the weights of the new nodes MC_U 330, MC_U 331, and MC_U 332. Again, each of the new nodes MC_U 330, MC_U 331, and MC_U 332 is assigned a default initial weight for calculating general ClipRank weights (step 220) or a default weight determined based on data associated with a specific user for calculating personalized ClipRank weights tailored to that user. Each of the relationship edges 340, R 341, R 342, R 344, R 345, and R 346 is assigned a predefined weight (step 225). Then, the weights of the nodes MC_U 330, MC_U 331, and MC_U 332 are repeated calculated under the difference between the weights calculated during the current iteration and the weights calculated during the previous iteration is less than or equal to a predefine threshold (steps 230, 240, 250).

Note that according to various embodiments, the weight associated with combined node 350 may be recalculated and updated, in which case it is calculated in the same manner as for the other nodes, or may remain unchanged, in which case no new weight value is calculated for combined node 350, throughout the weight calculation process. Finally, the resulting weights of the nodes may be used to rank the nodes (step 260).

ClipRank System Architecture

The ClipRank system and method may be implemented as computer program product(s) having a set of computer program instructions. The computer program instructions with which embodiments of the invention are implemented may be stored in any type of computer-readable media, and may be executed according to a variety of computing models including, for example, on a consumer electronic device, on a standalone computing device, or according to a distributed computing model in which various of the functionalities described herein may be effected or employed at different locations.

Figure 4:
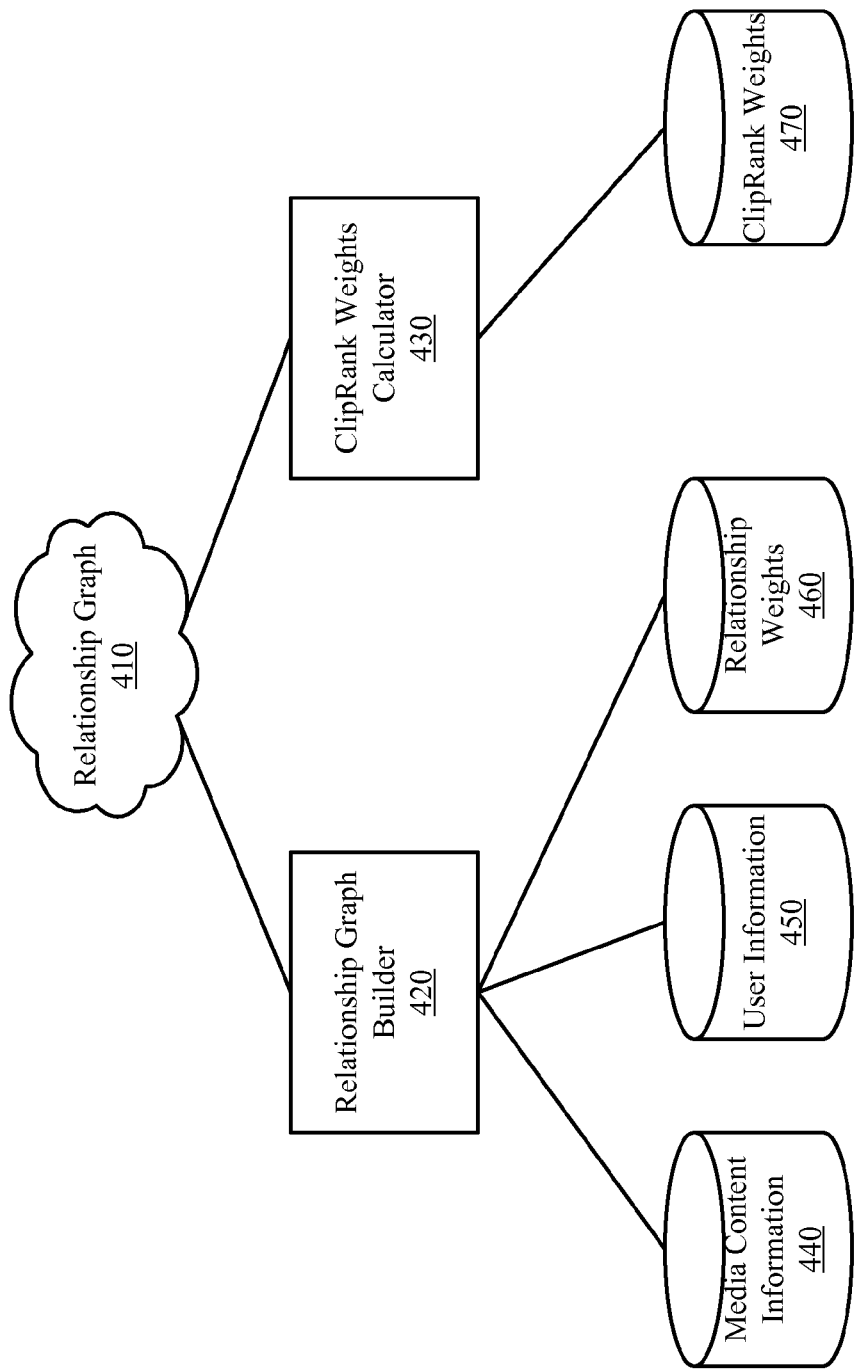
FIG. 4 is a simplified diagram illustrating a system of ranking media content using their relationships with end users according to one embodiment of the invention.

FIG. 4 is a simplified diagram illustrating a system of ranking media content using their relationships with end users according to one embodiment of the invention. One or more databases may be used to store information relating to the media content, the users, and actions the users have taken with respect to the media content and other users that may be used to determine the relationships among the users and the media content. Such information may be obtained from various sources, such as the metadata associated with the media content and users or log files recording user actions. For example, in FIG. 4, database 440 stores information associated with the media content and database 450 stores information associated with the users. The relationship graph builder 420 uses information stored in one or more databases, e.g. media content information 440 and user information 450, to construct the relationship graph 410. Another database 450 may be used to store predefined weights for various types of relationships, and the relationship graph builder 420 uses assign these predefined weights to the appropriate edges representing the various relationships in the relationship graph 410. In addition, the relationship graph builder 420 may assign general or personalized initial weights to the nodes representing the users and the media content in the relationship graph 410.

Once the relationship graph 410 has been constructed, the ClipRank weights calculator 430 calculate the final weights of the users and method content in the relationship graph 410 and stores the weights in database 470.

Combining ClipRank and Collaborative Filtering

ClipRank, by itself, may be used to rank a set of media content and/or users in a variety of applications, especially where it is desirable for the ranking results to take into consideration the relationships among the media content and the users. Alternatively, ClipRank, both general and personalized, may be combined with Collaborative Filtering to rank a selected set of media content.

Collaborative Filtering (CF) is the process of filtering for information or patterns using techniques involving collaboration among multiple agents, viewpoints, data sources, etc. Collaborative Filtering typically yield more accurate results when applied to very large data sets, such as data sets including hundreds, thousands, or millions of data points. As applied to ranking a set of media content, Collaborative Filtering may be used to calculate or estimate a ranking or weight value a particular user would give a particular piece of media content that is unknown to the user based on other ratings the user has given to other pieces of media content in the past and ratings given by other users to various pieces of media content.

There are various algorithms that may be used to calculate Collaborative Filtering values, and specific embodiments may select different algorithms that are suitable for their specific requirements. To briefly explain the general concept of Collaborative Filtering, suppose with respect to a group of users and a set of media content, selected users have interacted with and rated selected pieces of media content. These relationships between the group of users and the set of media content may be represented by a matrix. The following Table 2 shows one example of the relationship matrix between a group of users, denoted by $U_1$ to $U_8$, and a set of media content, denoted by $MC_1$ to $MC_{20}$. To simplify the discussion, the example shown in Table 2 only includes a small number of users and pieces of media content. In practice, there is no limit on the number of users and pieces of media content that may be included in such kind of relationship matrix.

TABLE 2

Relationship Matrix between Users and Media Content

|  | $U_1$ | $U_2$ | $U_3$ | $U_4$ | $U_5$ | $U_6$ | $U_7$ | $U_8$ |
| --- | --- | --- | --- | --- | --- | --- | --- | --- |
| $MC_1$ | 3 |  |  |  | 3* |  | 3 |  |
| $MC_2$ |  |  |  | 3 |  |  | 4 |  |
| $MC_3$ | 5 | 5 |  |  |  |  |  | 2 |
| $MC_4$ | 2 |  |  |  | 2 |  | 2 |  |
| $MC_5$ | 5 | 5 |  |  |  | 4 | 3 |  |
| $MC_6$ |  |  | 3 | 2.5* |  | 2 |  | 1 |
| $MC_7$ | 1 |  | 1 | 1 |  | 1 | 1 |  |
| $MC_8$ |  |  |  | 5 |  |  |  |  |
| $MC_9$ | 4 | 2 |  |  |  |  |  |  |
| $MC_{10}$ |  |  |  |  | 1 | 3 |  |  |
| $MC_{11}$ |  | 1 |  |  |  |  | 5 | 1 |
| $MC_{12}$ |  |  | 3 |  |  |  |  |  |
| $MC_{13}$ |  | 3 |  |  | 3 |  | 2 |  |
| $MC_{14}$ | 3 |  |  |  | 3 | 3 |  |  |
| $MC_{15}$ | 2 |  |  |  |  |  |  |  |
| $MC_{16}$ | 1 |  |  |  | 1 |  |  |  |
| $MC_{17}$ |  |  | 4 | 4 |  | 4 |  | 1 |
| $MC_{18}$ | 4 |  |  | 5 |  |  |  | 3 |
| $MC_{19}$ |  |  | 1 |  |  |  |  |  |
| $MC_{20}$ |  | 4 | 4 |  | 4 |  |  | 1 |

In Table 2, suppose a numerical rating system having values between 1 and 5 is used, and if a particular user has rated a piece of media content, then the corresponding rating value is indicated in the appropriate cell (without "*"). For example, user $U_1$ has rated media content $MC_1$, $MC_3$, $MC_4$, $MC_5$, $MC_7$, $MC_9$, $MC_{14}$, $MC_{15}$, $MC_{16}$, and $MC_{18}$. User $U_2$ has rated media content $MC_3$, $MC_5$, $MC_9$, $MC_{11}$, $MC_{13}$, and $MC_{20}$. And so on. Conversely, an empty cell in the matrix table indicates that the user has not rated that particular piece of media content. For example, user $U_1$ has not rated media content $MC_2$, $MC_6$, $MC_8$, $MC_{10}$, $MC_{11}$, $MC_{12}$, $MC_{13}$, $MC_{17}$, $MC_{19}$, and $MC_{20}$. And so on. Since in practice, the number of pieces of media content tend to be very large, it is unlikely for any user to have rated all available media content. Consequently, a rating matrix in practice often has many empty cells, i.e., missing ratings.

One way to estimate ratings for a particular user is to find patterns that indicate similarities between the ratings given by this user and ratings given by other users. For examples, users $U_1$ and $U_5$ have both given media content $MC_4$, $MC_{14}$, and $MC_{16}$ the same ratings respectively, which suggests that these two users have similar preferences. User $U_5$ has not rated media content $MC_1$, but user $U_1$ has given media content $MC_1$ a rating value of 3. Thus, based on the existing rating data, it may be reasonable to estimate that user $U_5$ would also give media content $MC_1$ a rating value of 3, similar to the rating value given by user $U_1$. The cell for $U_5$ and $MC_1$ may then be filled with the estimated rating value of 3. To distinguish a rating value actually assigned by a user from an estimated rating value, in Table 2, estimated rating values are marked with "*".

In another example, users $U_3$, $U_4$, and $U_6$ have all given media content $MC_7$ and $MC_{17}$ the same ratings respectively, which suggests that these three users have similar preferences. User $U_4$ has not rated media content $MC_6$, but both users $U_3$ and $U_6$ haven rated media content $MC_6$, user $U_3$ giving a rating value of 3 and user $U_6$ giving a rating value of 2. Based on the existing rating data, it may be reasonable to estimate that user $U_4$ would give media content $MC_6$ a rating value that is the average of the rating values given by users $U_3$ and $U_6$, i.e., 2.5. Thus, by repeatedly finding similarities among the rating values given by the users, it may be possible to estimate a rating value for every user with respect to every piece of unrated media content in the matrix table. In other words, all the empty cells in the matrix table may eventually be filled with estimated rating values. Often, the larger the datasets, i.e., a very larger number of users and media content, the more accurate the estimated rating values.

There are different ways to combine ClipRank and Collaborative Filtering. According to one embodiment, ClipRank is first used to reduce the size of the dataset, i.e., the size of the matrix, and then Collaborative Filtering is used to estimate ratings for all the remaining media content.

As explained above, in practice, a dataset used for Collaborative Filtering often contains a very large number, such as thousands or millions, of data points. This means that a matrix such as the one shown in Table 2 often contains very large numbers of users and pieces of media content. It is unlikely that each individual user has rated all the available media content. In fact, it is more likely that an individual user has only rated a selected, small number of media content. Consequently, there is the need to estimate ratings for many pieces of media content for each user using Collaborative Filter, which may be very time-consuming.

Figure 5:
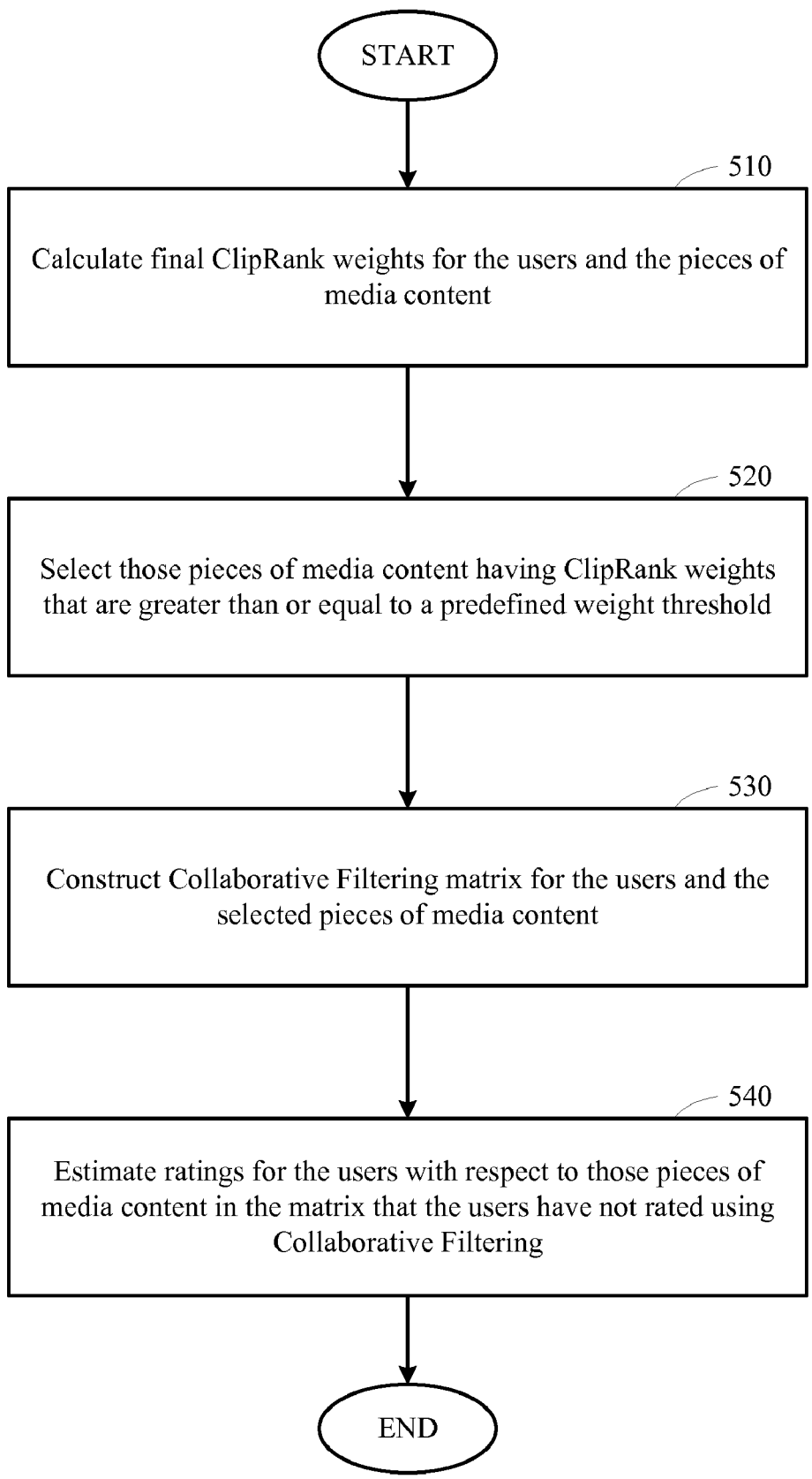
FIG. 5. shows a method of combining Collaborative Filtering and ClipRank by using ClipRank to select a subset of media content used for Collaborative Filtering.

One way to reduce the size of the dataset, and specifically the number of pieces of media content is to use ClipRank. FIG. 5 shows a method of combining Collaborative Filtering and ClipRank by using ClipRank to select a subset of media content used for Collaborative Filtering. First, the initial set of media content is ranked based on their ClipRank weights using the method described in FIG. 2 (step 510), i.e., constructing a relationship graph for the users and the pieces of media content, assigning initial weight values to the users and the media content, assigning predefined weight values to the relationships, repeatedly calculating the weight values associated with the users and the media content until the difference between the weight values calculated during the current iteration and the previous iteration is smaller than or equal to a predefined threshold value. Either general ClipRank weights or personalized ClipRank weights may be used.

Once the final ClipRank weights associated with the users and the media content are determined, the media content may be selected based on their final weights (step 520). For example, only media content having ClipRank weight values greater than or equal to a second predefined threshold is selected to be included in the matrix for Collaborative Filtering. By doing so, those pieces of media content having lower weights, i.e., lower ranking, are filtered out, since they do not appear to be popular among the users. Only pieces of media content having higher weights, i.e., higher ranking, are used for Collaborative Filtering. This reduces the size of the Collaborative Filtering matrix, and the time required to estimate ratings for the individual users.

Note that the higher the weight threshold, the less number of pieces of media content is selected for the Collaborative Filtering matrix, and vice versa. Thus, by carefully selecting the weight threshold, the size and complexity of the Collaborative Filtering matrix may be controlled.

A matrix is constructed using only those selected pieces of media content whose weights are greater than or equal to the weight threshold (step 530). And Collaborative Filtering is used to estimate the ratings for the individual users with respect to the pieces of media content in the matrix that the users have not rated (step 540).

According to another embodiment, Collaborative Filtering is used to obtain personalized ClipRank for a specific user, such that the ratings actually given to some pieces of media content by the user and the ratings estimated for other pieces of media content for the user using Collaborative Filtering are used as the initial weight values for calculating personalized ClipRank weights for the user.

Recall that personalized ClipRank is biased toward a particular user. The difference between personalized ClipRank and general ClipRank is that with personalized ClipRank, the initial weights assigned to the pieces of media content in the relationship graph are determined based on data associated with a particular user, whereas with general ClipRank, the initial weights assigned to the pieces of media content in the relationship graph are predefined default values, and usually the same value for all the media content.

Figure 6:
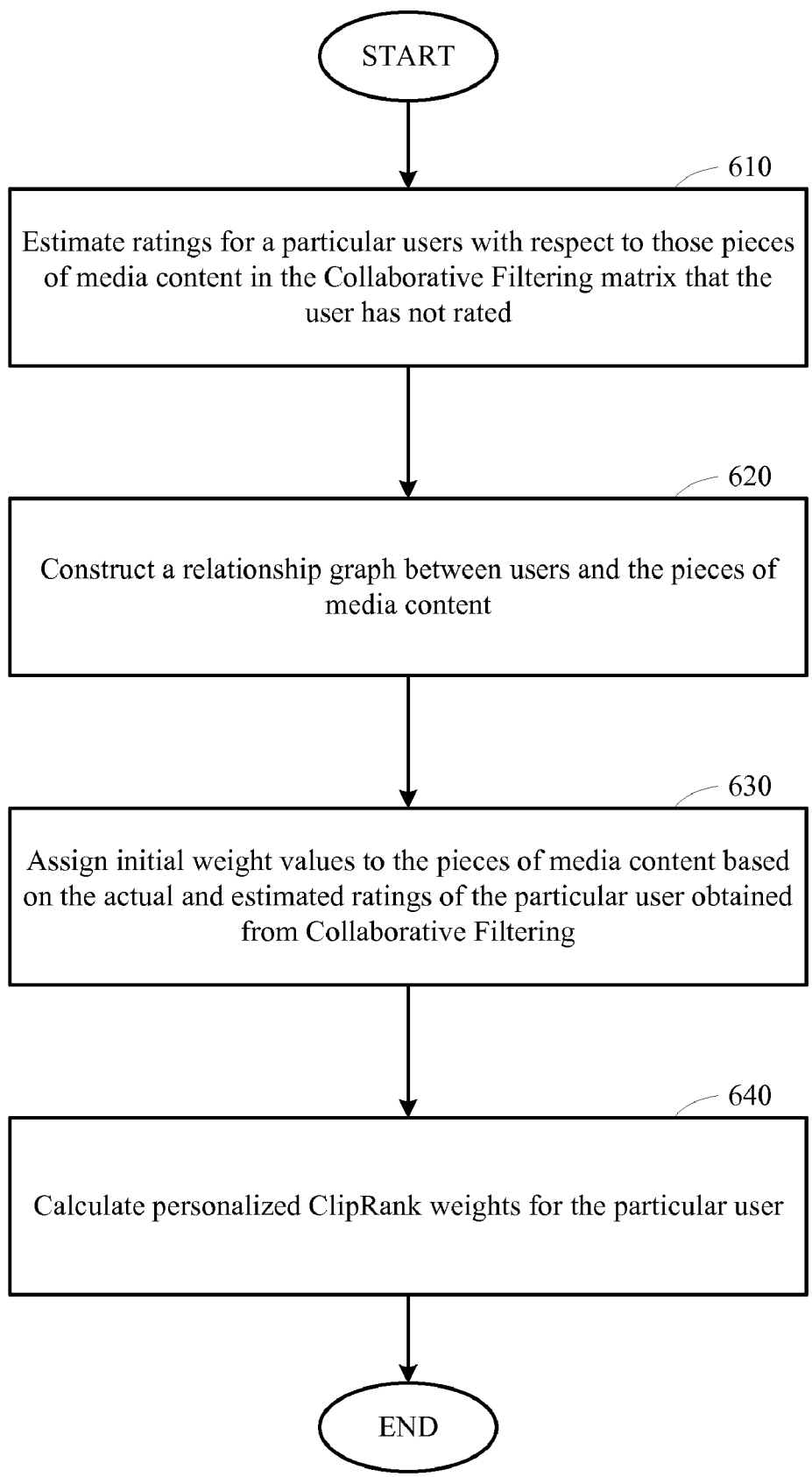
FIG. 6 shows a method of combining Collaborative Filtering and ClipRank by using Collaborative Filtering to provide initial weight values for the media content in the relationship graph to obtain personalized ClipRank for a particular user.

Thus, ratings obtained using Collaborative Filtering for a particular user may be used as the initial weights assigned to the pieces of media content in the relationship graph to obtain personalized ClipRank for that user. FIG. 6 shows a method of combining Collaborative Filtering and ClipRank by using Collaborative Filtering to provide initial weight values for the media content in the relationship graph to obtain personalized ClipRank for a particular user.

Suppose there are a group of users and a set of media content. A Collaborative Filtering matrix, such as the one shown in Table 2, is constructed for the users and the media content. Usually, each user has given actual ratings to selected pieces of media content, but it is unlikely, although not impossible, that a single user has rated each and every piece of media content in the matrix. Using the matrix shown in Table 2 as an example, user $U_1$ has given actual ratings to media content $MC_1$, $MC_3$, $MC_4$, $MC_5$, $MC_7$, $MC_9$, $MC_{14}$, $MC_{15}$, $MC_{16}$, and $MC_{18}$, but has not rated the other pieces of media content. However, ratings for the other pieces of media content, i.e., $MC_2$, $MC_6$, $MC_8$, $MC_{10}$, $MC_{11}$, $MC_{12}$, $MC_{13}$, $MC_{17}$, $MC_{19}$, and $MC_{20}$ may be estimated for user $U_1$ using Collaborative Filtering (step 610).

Once the ratings for all the pieces of media content unrated by user $U_1$ have been estimated, a relationship graph, such as the one shown in FIG. 1, may be constructed for the users and the media content (step 620). The initial weights assigned to the users may be predefined default values. Similarly the weights assigned to the relationships are also predefined values. However, the initial weights assigned to the media content are determined based on the ratings actually given by user $U_1$ or estimated for user $U_1$ in the Collaborative Filtering matrix (step 630). A direct correlation may be predefined between the rating values and the weight values. For example, the weight values may equal to the rating values, equal to the rating values multiplied by a factor, etc.

Then, the final ClipRank weights for the users and the media content may be calculated using the method shown in FIG. 2 (step 640), i.e., repeatedly calculating the weight values associated with the users and the media content until the difference between the weight values calculated during the current iteration and the previous iteration is smaller than or equal to a predefined threshold value. Since the initial weight values assigned to the media content in the relationship graph are determined based on Collaborative Filtering ratings obtained for a particular user, i.e., $U_1$, the final ClipRank weights obtained in this case is biased toward user $U_1$. In other words, the final ClipRank weights are personalized for user $U_1$. The same method may be used to obtain personalized ClipRank weights for any other users.

Blending ClipRank and Collaborative Filtering

Figure 7:
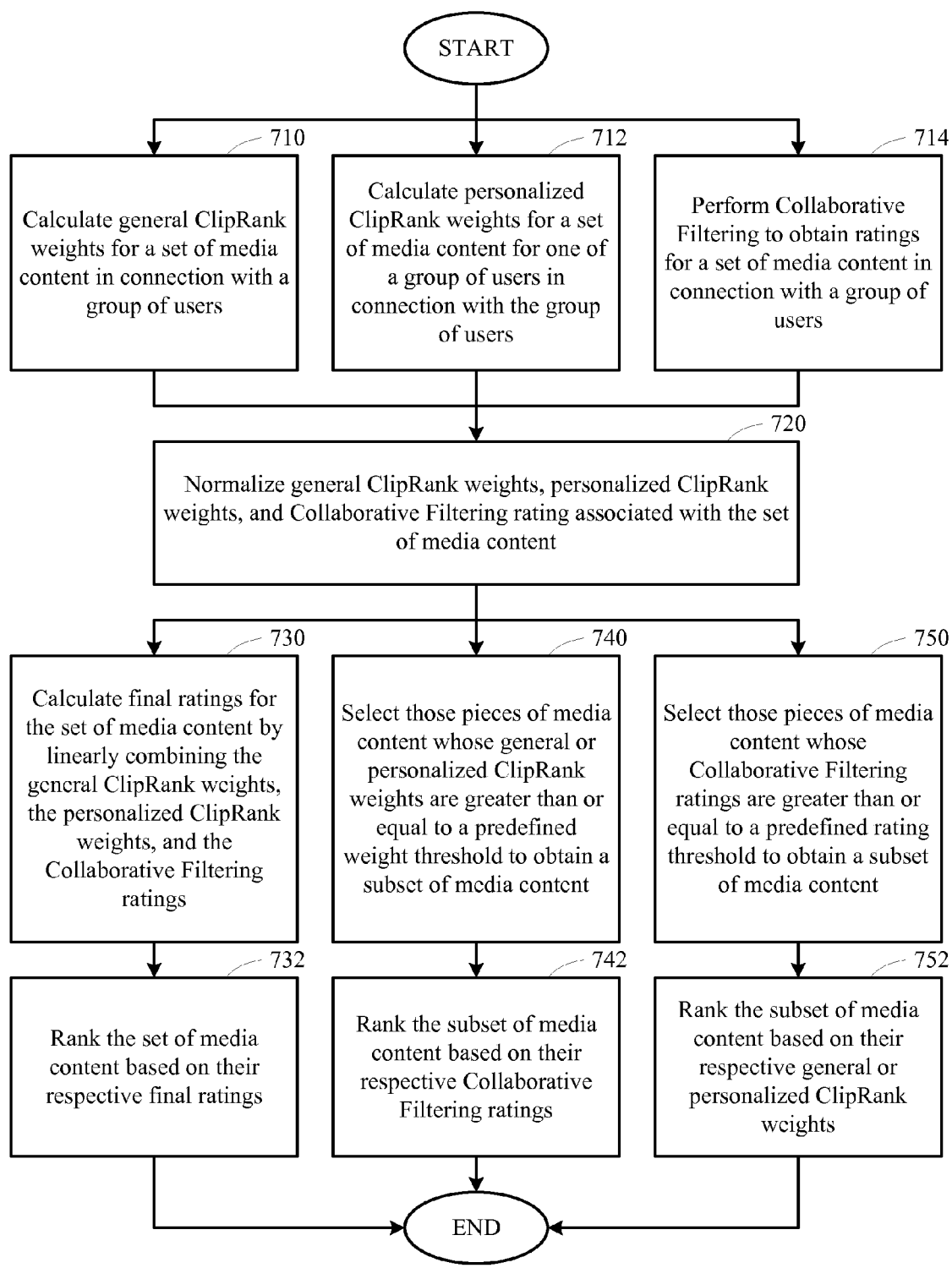
FIG. 7 shows a method of blending Collaborative Filtering, general ClipRank, and/or personalized ClipRank.

With respect to a set of media content, the pieces may be ranked based on their respective general ClipRank weights, personalized ClipRank weights, or Collaborative Filtering ratings. In addition, the results from general ClipRank, personalized ClipRank, and/or Collaborative Filtering may be blended in various ways. FIG. 7 shows a method of blending Collaborative Filtering, general ClipRank, and/or personalized ClipRank.

Suppose there is a set of media content associated with a group of users. First, the general ClipRank weights (step 710), the personalized ClipRank weights (step 712), and the Collaborative Filtering ratings (step 714) are calculated separately for the set of media content in connection with the group of users. Again, the general ClipRank weights and the personalized ClipRank weights may be calculated using the method shown in FIG. 2 or as slightly modified thereof, and the Collaborative Filtering ratings may be determined by performing any form of Collaborative Filtering algorithm on the set of media content and the group of users. Steps 710, 712, and 714 may be performed in any sequence or simultaneously, since each step does not depend on the results of the other two steps.

Next, optionally, the general ClipRank weights, the personalized ClipRank weights, and the Collaborative Filtering ratings obtained for the set of media content are normalized if they do not all have the same rating scales (step 720). For example, the general and personalized ClipRank weights may use a rating scale from 1 to 10, while the Collaborative Filtering ratings may use a rating scale from 1 to 100. In this case, the two rating scales need to be normalized to the same scale, e.g., by multiplying each ClipRank weight value by 10 or dividing each Collaborative Filtering rating value by 10, so that the three sets of numbers may be blended.

There are various ways to blend the general ClipRank weights, the personalized ClipRank weights, and/or the Collaborative Filtering ratings for the set of media content. For example, the general ClipRank weights and the Collaborative Filtering ratings may be blended. Alternatively, the personalized ClipRank weights and the Collaborative Filtering ratings may be blended. Finally, all three sets of numbers, i.e., the general ClipRank weights, the personalized ClipRank weights, and the Collaborative Filtering ratings, may be blended together.

According to one embodiment, the general ClipRank weights, the personalized ClipRank weights, and/or the Collaborative Filtering ratings are linearly blended to obtain final ratings for the set of media content (step 730).

First, to linearly blend the general ClipRank weight and the Collaborative Filtering rating for a piece of media content, a final rating for the piece of media content may be calculated using the following equation:

$$\text{final rating}=W_1*\text{GCRW}+W_2*\text{CFR}; \quad (7)$$

where GCRW denotes the general ClipRank weight associated with the piece of media content, $W_1$ denotes a blending weight giving to the general ClipRank weight, CFR denotes the Collaborative Filtering rating associated with the piece of media content, and $W_2$ denotes a blending weight giving to the Collaborative Filtering rating.

Next, to linearly blend the personalized ClipRank weight and the Collaborative Filtering rating for a piece of media content, a final rating for the piece of media content may be calculated using the following equation:

$$\text{final rating}=W_1*\text{PCRW}+W_2*\text{CFR}; \quad (8)$$

where PCRW denotes the personalized ClipRank weight associated with the piece of media content, $W_1$ denotes a blending weight giving to the personalized ClipRank weight, CFR denotes the Collaborative Filtering rating associated with the piece of media content, and $W_2$ denotes a blending weight giving to the Collaborative Filtering rating.

Finally, to linearly blend the general ClipRank weight, the personalized ClipRank weight, and the Collaborative Filtering rating for a piece of media content, a final rating for the piece of media content may be calculated using the following equation:

$$\text{final rating}=W_1*\text{GCRW}+W_2*\text{PCRW}+W_3*\text{CFR}; \quad (9)$$

where GCRW denotes the general ClipRank weight associated with the piece of media content, $W_1$ denotes a blending weight giving to the general ClipRank weight, PCRW denotes the personalized ClipRank weight associated with the piece of media content, $W_2$ denotes a blending weight giving to the personalized ClipRank weight, CFR denotes the Collaborative Filtering rating associated with the piece of media content, and $W_3$ denotes a blending weight giving to the Collaborative Filtering rating.

The blending weights, $W_i$, given to the general and personalized ClipRank weight and the Collaborative Filtering rating control how much weight each variable contributes to the final rating in equations (7), (8), and (9). Thus, by adjusting the blending weights, the contributions of the three variables to the final rating may be adjusted. For example, in equation (9), if it is desirable for the final rating to be relatively more dependent on the general ClipRank weight, then the blending weight for the general ClipRank weight, $W_1$, may be increased while the blending weights for the personalized ClipRank weight and the Collaborative Filtering rating, $W_2$ and $W_3$ respectively, may be decreased. Conversely, if it is desirable for the final rating to be relatively more dependent on the Collaborative Filtering rating, then the blending weight for the Collaborative Filtering rating, $W_3$, may be increased while the blending weights for the general ClipRank weight and the personalized ClipRank weight, $W_1$ and $W_2$ respectively, may be decreased.

Once the final ratings have been calculated for all the pieces of media content consistently using any one of equations (7), (8), or (9), the set of media content may be ranked based on their respective final ratings (step 732).

According to another embodiment, first, a subset of media content is selected by choosing those pieces of media content from the original set of media content whose general or personalized ClipRank weights are greater than or equal to a predefined weight threshold (step 740). By adjusting the weight threshold, the number of pieces of media content selected for the subset of media content may be increased or decreased. Then, the subset of media content is ranked based on their respective Collaborative Filtering ratings (step 742).

According to another embodiment, first, a subset of media content is selected by choosing those pieces of media content from the original set of media content whose Collaborative Filtering ratings are greater than or equal to a predefined rating threshold (step 750). Again, by adjusting the rating threshold, the number of pieces of media content selected for the subset of media content may be increased or decreased. Then, the subset of media content is ranked based on their respective general or personalized ClipRank weights (step 752).

A set of media content may be ranked using general ClipRank, personalized ClipRank, Collaborative Filtering, or various combinations or blending of general ClipRank, personalized ClipRank, and/or Collaborative Filtering. There are many applications or situations where it is desirable rank a set of media content. One particular usage of these ranking methods is for recommending personalized video content. System and methods for providing personalized video content are described in more detail in co-pending U.S. patent application Ser. No. 12/120,203, filed on May 13, 2008 (concurrently herewith on the same day as the present application), entitled "A PERSONALIZED VIDEO SYSTEM" by Gibbs et al., which is hereby incorporated by reference in its entirety and for all intents and purposes. To summarize, information with respect to individual media devices are automatically monitored and collected, and such information is used to help select personalized video content for the users of the individual media devices. The selected video content may first be ranked using general or personalized ClipRank or combinations of ClipRank and Collaborative Filtering before being presented to the device users.

The methods of combining ClipRank and Collaborative Filtering, e.g., steps shown in FIGS. 5, 6 and 7, may be implemented as computer program product(s) having a set of computer program instructions. The computer program instructions with which embodiments of the invention are implemented may be stored in any type of computer-readable media, and may be executed according to a variety of computing models including, for example, on a consumer electronic device, on a stand-alone computing device, or according to a distributed computing model in which various of the functionalities described herein may be effected or employed at different locations.

Figure 8A:
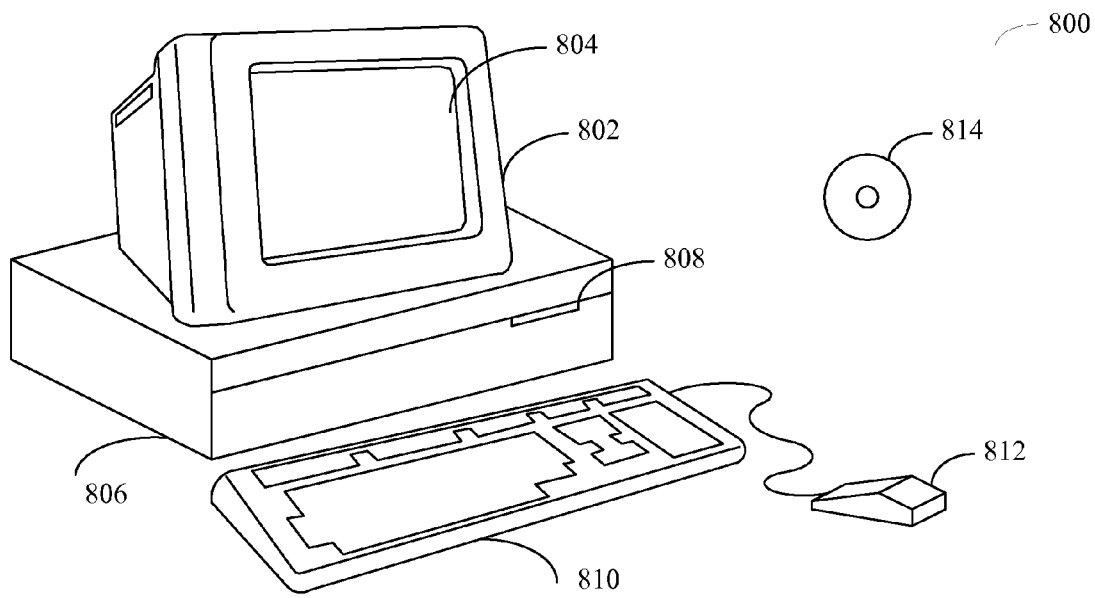
FIGS. 8A and 8B illustrate a computer system 800 suitable for implementing embodiments of the present invention.
Figure 8B:
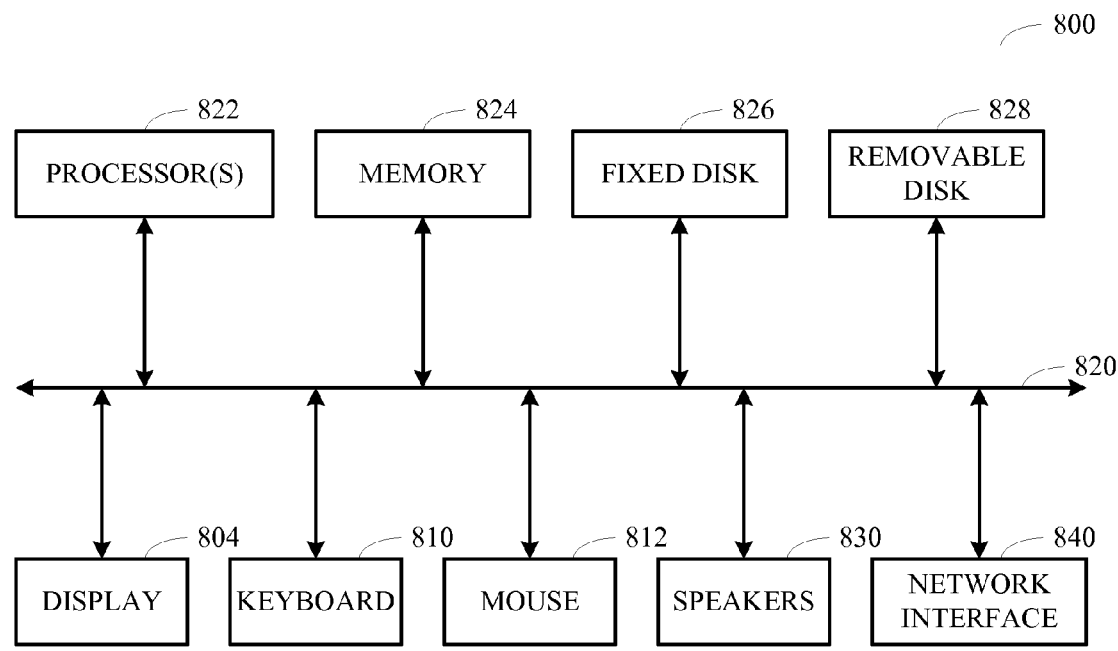

FIGS. 8A and 8B illustrate a computer system 800 suitable for implementing embodiments of the present invention. FIG. 8A shows one possible physical form of the computer system. The computer program instructions implementing the various embodiments of the invention may be executed on such a computer system. Of course, the computer system may have many physical forms including an integrated circuit, a printed circuit board, a small handheld device (such as a mobile telephone or PDA), a personal computer or a super computer. Computer system 800 includes a monitor 802, a display 804, a housing 806, a disk drive 808, a keyboard 810 and a mouse 812. Disk 814 is a computer-readable medium used to transfer data to and from computer system 800.

FIG. 8B is an example of a block diagram for computer system 800. Attached to system bus 820 are a wide variety of subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 828 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, although the system and method are described in connection with ranking media content, the same concept may be applied to rank any objects or matters that have various types of relationships among themselves.

In addition, in the embodiment shown in FIG. 2, the weights associated with a user or a piece of media content are calculated based on the relationships directly and immediately connected with the user or the piece of media content, i.e., the first level relationships. However, it is possible to take into consideration subsequent levels of relationships, i.e., relationships further removed, when calculating the weights associated with a particular user or a particular piece of media content. For example, in the relationship graph shown in FIG. 1, node MC 123 is connected with node U 112 by edge R 147. Thus, node MC 123 only has one first level relationship, R 147. However, node U 112 has additional relationships, R 148, R 149, R 150, and R 157 with other nodes MC 122 and MC 127. These relationships are further removed from node MC 123, i.e., second level relationships, and are not directly connected with node MC 123. But since they are directly connected with node U 112, which is directly connected with node MC 123, their weights may also have some influence on the weights of node MC 123, although the influence may not be as strong as the influence asserted by the first level relationship R 147. Generally, the farther a relationship is removed from a node, the less influence its weight has on the weight associated with that node. Nevertheless, it is possible to define different formulas for calculating the weights associated with the nodes, i.e. users and media content, which take into consideration the weights associated with multiple levels of relationships.

Furthermore, they may be other ways to combine ClipRank and Collaborative Filtering. It is therefore intended that the following appended claims be interpreted as including all such alterations, permutations, and various substitute equivalents as fall within the true spirit and scope of the present invention.

What is claimed is:

1. A computer-implemented method of ranking and selecting pieces of media content for collaborative filtering, comprising:
   assigning a weight to each of a multiplicity of pieces of media content and each of a plurality of users, each piece of media content having at least one relationship with at least one of the users, each user having at least one relationship with at least one of the pieces of media content, a weight being assigned to each relationship;
   calculating, in a computer system, a weight for each one of the multiplicity of pieces of media content based on the weights of the at least one relationship that the piece of media content has;
   selecting from the multiplicity of pieces of media content a plurality of selected pieces of media content based on a ranking of the weights of the multiplicity of pieces of media content; and
   performing collaborative filtering on the plurality of selected pieces of media content and the plurality of users, the collaborative filtering including, for each of the plurality of users, calculating ratings for those pieces of the plurality of selected pieces of media content that have not been rated by the user based on ratings given to other pieces of the plurality of selected pieces of media content by the user and selected ratings given to the plurality of selected pieces of media content by other users in the plurality of users.

2. A method as recited in claim 1, wherein:
   each one of the multiplicity of pieces of media content and each one of the plurality of users is a node, the multiplicity of pieces of media content and the plurality of users being a multiplicity of nodes, each node having at least one relationship with at least one other node; and
   calculating the weight for each piece of media content comprises for each of the multiplicity of nodes, recursively calculating and updating the weight associated with each node until a difference between the weights associated with the multiplicity of nodes calculated during a current iteration and the weights associated with the multiplicity of nodes during a previous iteration is less than a predefined threshold, wherein the weight associated with each node is calculated based on the weights of the at least one relationship and the weights of the nodes with which the node has the at least one relationship.

3. A method as recited in claim 2, wherein:
the weight associated with each node equals $$\sum_{i=1}^{i=n}(W_i(r) * W_i(\text{mc\_u})),$$

wherein n denotes a total number of relationships the node has with other nodes, $W_i(r)$ denotes the weight associated with a relationship, relationship i, which denotes a relationship that the node has with one of the other nodes, and $W_i(\text{mc\_u})$ denotes the weight associated with the one of the other nodes that the node has the relationship i with.

4. A method as recited in claim 2, wherein calculating the weight for each one of the multiplicity of pieces of media content further comprises:
   assigning an initial value to each weight associated with each of the multiplicity of pieces of media content;
   assigning an initial value to each weight associated with each of the plurality of users; and
   defining a value to each weight associated with each relationship.

5. A method as recited in claim 2, wherein the difference between the weights associated with the multiplicity of nodes calculated during a current iteration and the weights associated with the multiplicity of nodes calculated during a previous iteration equals $$\left(\sum_{i=1}^{i=n} W_{i,j}(\text{mc\_u}) - \sum_{i=1}^{i=n} W_{i,(j-1)}(\text{mc\_u})\right),$$

where n denotes a total number of the multiplicity of nodes, $W_{i,j}(\text{mc\_u})$ denotes the weight associated with a node i, during the current iteration, iteration j, and $W_{i,(j-1)}(\text{mc\_u})$ denotes the weight associated with a node i, during the previous iteration, iteration j−1.

6. A method as recited in claim 2, wherein the difference between the weights associated with the multiplicity of nodes calculated during a current iteration and the weights associated with the multiplicity of nodes calculated during a previous iteration equals $$\left(\frac{\sum_{i=1}^{i=n} W_{i,j}(\text{mc\_u})}{n} - \frac{\sum_{i=1}^{i=n} W_{i,(j-1)}(\text{mc\_u})}{n}\right),$$

where n denotes a total number of the multiplicity of nodes, $W_{i,j}(\text{mc\_u})$ denotes the weight associated a node i during the current iteration, iteration j, and $W_{i,(j-1)}(\text{mc\_u})$ denotes the weight associated with a node i during the previous iteration, iteration j−1.

7. A method as recited in claim 1, wherein the plurality of selected pieces of media content are selected based on those pieces having weights greater than a predefined weight threshold, the method further comprising:
   adjusting a number of the plurality of selected pieces of media content by increasing or decreasing the predefined weight threshold.

8. A method as recited in claim 1, further comprising:
   recommending at least one piece of the selected pieces of media content to one of the plurality of users based on at least one rating calculated for the at least one piece of media content for the user using collaborative filtering.

9. A method as recited in claim 1, wherein each of the weights is represented by a numerical value.

10. A method as recited in claim 1, wherein the plurality of users includes a first user and a second user, there being at least two distinct relationships between the first and second users that have different weights and represent different types of relationships between the first and second users.

11. A method as recited in claim 1, wherein the multiplicity of pieces of media content includes a first piece of media content and a second piece of media content, there being at least two distinct relationships between the first and second pieces of media content that have different weights and represent different types of relationships between the first and second pieces of media content.

12. A method as recited in claim 1, wherein one of the users has at least two distinct relationships with one of the pieces of media content, wherein the at least two distinct relationships have different weights and represent different types of relationships between the one of the users and the one of the pieces of media content.

13. A method as recited in claim 1, wherein the plurality of selected pieces of media content includes fewer pieces of media content then the multiplicity of pieces of media content.

14. A computer-implemented method for using collaborative filtering to calculate personalized weights for pieces of media content, comprising:
  assigning a weight to each of a plurality of pieces of media content and each of a plurality of users, each piece of media content having at least one relationship with at least one of the users, each user having at least one relationship with at least one of the pieces of media content, a weight being assigned to each relationship;
  performing collaborative filtering on the plurality of pieces of media content and the plurality of users for a first user of the plurality of users, the collaborative filtering including calculating ratings for those pieces of the plurality of pieces of media content that have not been rated by the first user based on ratings given to other pieces of the plurality of pieces of media content by the first user and selected ratings given to the plurality of pieces of media content by users other than the first user; and
  calculating, in a computer system, personalized weights associated with the plurality of pieces of media content based on the ratings calculated using the collaborative filtering, wherein the calculating of the personalized weights is further based on the weights of the at least one relationship that each piece of media content has.

15. A method as recited in claim 14, wherein:
  each one of the plurality of users is a node and each one of the plurality of pieces of media content is a node, the plurality of users and the plurality of pieces of media content being a multiplicity of nodes, each node having at least one relationship with at least one other node;
  calculating personalize weights associated with the plurality of pieces of media content for the first user further comprises:
    assigning an initial value to the weight associated with each of the plurality of pieces of media content, wherein an initial value of a weight associated with a piece of media content is determined based on at least one selected from a group consisting of a rating given to that piece of media content by the first user and the rating calculated for that piece of media content for the user by the performance of collaborative filtering; and
    for each of the multiplicity of nodes, recursively calculating and updating the weight associated with each node until the difference between the weights associated with the multiplicity of nodes calculated during a current iteration and the weights associated with the multiplicity of nodes calculated during a previous iteration is less than a predefined threshold, wherein the weight associated with each node is calculated based on the weights of the at least one relationship and the weights of the at least one node with which the node has the at least one relationship.

16. A method as recited in claim 15, wherein the weight associated with each node equals $$\sum_{i=1}^{i=n} W(r)_i * W(\text{mc\_u})_i,$$

where n denotes a total number of relationships the node has with other nodes, $W(r)_i$ denotes the weight associated with a relationship the node has with another node, and $W(\text{mc\_u})_i$ denotes the weight associated with the corresponding other node having the relationship with the node.

17. A method as recited in claim 14, further comprising:
  recommending at least one piece of the plurality of pieces of media content to the users based on the personalized weight associated with the at least one piece of media content.

18. A method as recited in claim 14, wherein one of the users has at least two distinct relationships with one of the pieces of media content, wherein the at least two distinct relationships have different weights and represent different types of relationships between the one of the users and the one of the pieces of media content.

19. A computer-implemented method of blending techniques for calculating weights for pieces of media content with collaborative filtering, comprising:
  assigning a weight to each of a multiplicity of pieces of media content and each of a plurality of users, each piece of media content having at least one relationship with at least one of the users, each user having at least one relationship with at least one of the pieces of media content, a weight being assigned to each relationship, one of the users having at least two distinct relationships with one of the pieces of media content, wherein the at least two distinct relationships have different weights and represent different types of relationships between the one of the users and the one of the pieces of media content;
  calculating, in a computer system, a weight for each one of the plurality of pieces of media content based on the weights of the at least one relationship that the piece of media content has;
  determining collaborative filtering ratings associated with the plurality of pieces of media content in connection with the plurality of users, wherein the determining of the collaborative filtering ratings includes, for each of the plurality of users, calculating ratings for the plurality of pieces of media content that have not been rated by the user based on ratings given to other pieces of the plurality of pieces of media content by the user and selected ratings given to the plurality of selected pieces of media content by other users in the plurality of users; and
  blending the weights and the collaborative filtering ratings associated with the plurality of pieces of media content.

20. A method as recited in claim 19, further comprising:
  normalizing the weights and the collaborative filtering ratings associated with the plurality of pieces of media content.

21. A method as recited in claim 19, wherein blending the weights and the collaborative filtering ratings associated with the plurality of pieces of media content comprises:
  for each of the plurality of pieces of media content, calculating a final rating, such that the final rating for each piece of media content equals $W_1*GCRW+W_2*CFR$, wherein GCRW denotes the weight associated with the piece of media content, $W_1$ denotes a blending weight given to the weight associated with the piece of media content, CFR denotes the collaborative filtering rating associated with the piece of media content, and $W_2$ denotes a blending weight given to the collaborative filtering rating.

22. A method as recited in claim 21, further comprising:
ranking the plurality of pieces of media content based on their respective final ratings.

23. A method as recited in claim 19, wherein blending the weights and the collaborative filtering ratings associated with the plurality of pieces of media content comprises:
selecting from the plurality of pieces of media content those pieces having weights greater than a predefined weight threshold to obtain a plurality of selected pieces of media content; and
ranking the plurality of selected pieces of media content based on their respective collaborative filtering ratings.

24. A method as recited in claim 19, wherein blending the weights and the collaborative filtering ratings associated with the plurality of pieces of media content comprises:
selecting from the plurality of pieces of media content those pieces having collaborative filtering ratings greater than a predefined rating threshold to obtain a plurality of selected pieces of media content; and
ranking the plurality of selected pieces of media content based on their respective weights.

25. A method as recited in claim 19, further comprising:
calculating personalized weights associated with the plurality of pieces of media content for a first user of the plurality of users, wherein the calculating of the personalized weights for the first user is based on collabortive filtering ratings determined for the first user and is further based on the weights of the relationships among the plurality of pieces of media content and the plurality of users.

26. A method as recited in claim 25, further comprising:
normalizing the weights, the personalized weights, and the collaborative filtering ratings associated with the plurality of pieces of media content.

27. A method as recited in claim 25, further comprising:
blending the personalized weights and the collaborative filtering ratings associated with the plurality of pieces of media content.

28. A method as recited in claim 27, wherein blending the personalized weights and the collaborative filtering ratings associated with the plurality of pieces of media content comprises:
for each of the plurality of pieces of media content, calculating a final rating, such that the final rating for a piece of media content equals $W_1*PCRW+W_2*CFR$, wherein PCRW denotes the personalized weight associated with the piece of media content, $W_1$ denotes a blending weight given to the personalized weight, CFR denotes the collaborative filtering rating associated with the piece of media content, and $W_2$ denotes a blending weight given to the collaborative filtering rating.

29. A method as recited in claim 28, further comprising:
ranking the plurality of pieces of media content based on their respective final ratings.

30. A method as recited in claim 27, wherein blending the personalized weights and the collaborative filtering ratings associated with the plurality of pieces of media content comprises:
selecting from the plurality of pieces of media content those pieces having personalized weights greater than a predefined weight threshold to obtain a plurality of selected pieces of media content; and
ranking the plurality of selected pieces of media content based on their respective collaborative filtering ratings.

31. A method as recited in claim 27, wherein blending the personalized weights and the collaborative filtering ratings associated with the plurality of pieces of media content comprises:
selecting from the plurality of pieces of media content those pieces having collaborative filtering ratings greater than a predefined rating threshold to obtain a plurality of selected pieces of media content; and
ranking the plurality of selected pieces of media content based on their respective personalized weights.

32. A method as recited in claim 25, further comprising:
blending the weights, the personalized weights and, the collaborative filtering ratings associated with the plurality of pieces of media content.

33. A method as recited in claim 32, wherein blending the weights, the personalized weights and the collaborative filtering ratings associated with the plurality of pieces of media content comprises:
for each of the plurality of pieces of media content, calculating a final rating, such that the final rating for a piece of media content equals $W_1*GCRW+W_2*PCRW+W_3*CFR$, wherein GCRW denotes the weight associated with the piece of media content, $W_1$ denotes a blending weight given to the weight, PCRW denotes the personalized weight associated with the piece of media content, $W_2$ denotes a blending weight giving to the personalized weight, CFR denotes the collaborative filtering rating associated with the piece of media content, and $W_3$ denotes a blending weight given to the collaborative filtering rating.

34. A method as recited in claim 33, further comprising:
ranking the plurality of pieces of media content based on their respective final ratings.

35. A computer program product for ranking and selecting pieces of media content for collaborative filtering, the computer program product comprising a computer-readable medium having a plurality of computer program instructions stored therein, which are operable to cause at least one computing device to:
assign a weight to each of a multiplicity of pieces of media content and each of a plurality of users, each piece of media content having at least one relationship with at least one of the users, each user having at least one relationship with at least one of the pieces of media content, a weight being assigned to each relationship;
calculate, in a computer system, a weight for each one of the multiplicity of pieces of media content based on the weights of the at least one relationship that the piece of media content has;
select from the multiplicity of pieces of media content a plurality of selected pieces of media content based on a ranking of the calculated weights of the multiplicity of pieces of media content; and
perform collaborative filtering on the plurality of selected pieces of media content and the plurality of users, the collaborative filtering including, for each of the plurality of users, calculating ratings for those pieces of the plurality of selected pieces of media content that have not been rated by the user based on ratings given to other pieces of the plurality of selected pieces of media content by the user and selected ratings given to the plurality of selected pieces of media content by other users in the plurality of users.

36. A computer program product as recited in claim 35, wherein one of the users has at least two distinct relationships with one of the pieces of media content, wherein the at least two distinct relationships have different weights and represent different types of relationships between the one of the users and the one of the pieces of media content.

37. A computer program product for using collaborative filtering to calculate personalized weights for pieces of media content, the computer program product comprising a computer-readable medium having a plurality of computer program instructions stored therein, which are operable to cause at least one computing device to:

assign a weight to each of a plurality of pieces of media content and each of a plurality of users, each piece of media content having at least one relationship with at least one of the users, each user having at least one relationship with at least one of the pieces of media content, a weight being assigned to each relationship;

perform collaborative filtering on the plurality of pieces of media content and the plurality of users for a first user of the plurality of users, the collaborative filtering including calculating ratings for those pieces of the plurality of pieces of media content that have not been rated by the first user based on ratings given to other pieces of the plurality of pieces of media content by the first user and selected ratings given to the plurality of pieces of media content by users other than the first user; and calculate, in a computer system, personalized weights associated with the plurality of pieces of media content based on the ratings calculated using collaborative filtering for the first user, wherein calculating of the weight for each one of the plurality of pieces of media content is further based on the weights of the at least one relationship that the piece of media content has.

38. A computer program product as recited in claim 37, wherein one of the users has at least two distinct relationships with one of the pieces of media content, wherein the at least two distinct relationships have different weights and represent different types of relationships between the one of the users and the one of the pieces of media content.

39. A computer program product for blending techniques for calculating weights of pieces of media content with collaborative filtering, the computer program product comprising a computer-readable medium having a plurality of computer program instructions stored therein, which are operable to cause at least one computing device to:

assign a weight to each of a multiplicity of pieces of media content and each of a plurality of users, each piece of media content having at least one relationship with at least one of the users, each user having at least one relationship with at least one of the pieces of media content, a weight being assigned to each relationship, one of the users having at least two distinct relationships with one of the pieces of media content, wherein the at least two distinct relationships have different weights and represent different types of relationships between the one of the users and the one of the pieces of media content;

calculate, in a computer system, a weight for each one of the plurality of pieces of media content based on the weights of the at least one relationship that the piece of media content has;

determine collaborative filtering ratings associated with the plurality of pieces of media content in connection with the plurality of users, wherein the determining of the collaborative filtering ratings includes, for each of the plurality of users, calculating ratings for the plurality of pieces of media content that have not been rated by the user based on ratings given to other pieces of the plurality of pieces of media content by the user and selected ratings given to the plurality of selected pieces of media content by other users in the plurality of users; and blend the calculated weights and the collaborative filtering ratings associated with the plurality of pieces of media content.

40. A computer program product as recited in claim 39, wherein the plurality of computer program instructions are further operable to cause at least one computing device to:

calculate personalized weights for a first user of the plurality of users, wherein the calculating of personalized weights for the first user is based on the collaborative filtering ratings determined for the first user and the weights of the relationships among the plurality of pieces of media content and the plurality of users.

41. A computer program product as recited in claim 40, wherein the plurality of computer program instructions are further operable to cause at least one computing device to:

blend the personalized weights and the collaborative filtering ratings associated with the plurality of pieces of media content.

42. A computer program product as recited in claim 40, wherein the plurality of computer program instructions are further operable to cause at least one computing device to:

blend the weights, the personalized weights, and the collaborative filtering ratings associated with the plurality of pieces of media content.

\* \* \* \* \*